(12) United States Patent
Jenkins et al.

(10) Patent No.: US 11,198,174 B2
(45) Date of Patent: Dec. 14, 2021

(54) KIT COMPRISING COMPONENTS MADE FROM PLANAR SHEET MATERIAL FOR FORMING FORGE TABLE AND FORGE POT, AND VALVE COMPONENT FOR SELECTIVELY COMMUNICATING AIRFLOW SOURCE AND FORGE POT

(71) Applicant: Cloverdale Forge, St. Andrews (CA)

(72) Inventors: Matthew T Jenkins, St. Andrews (CA); Karen M Rudolph, St. Andrews (CA)

(73) Assignee: Cloverdale Forge, Manitoba (CA)

( * ) Notice: Subject to any disclaimer, the term of this patent is extended or adjusted under 35 U.S.C. 154(b) by 116 days.

(21) Appl. No.: 16/827,983

(22) Filed: Mar. 24, 2020

(65) Prior Publication Data

US 2020/0306819 A1 Oct. 1, 2020

Related U.S. Application Data

(60) Provisional application No. 62/851,311, filed on May 22, 2019.

(30) Foreign Application Priority Data

Mar. 28, 2019 (CA) ................................ CA 3038315

(51) Int. Cl.
*F16M 11/00* (2006.01)
*B21J 9/02* (2006.01)
(Continued)

(52) U.S. Cl.
CPC ................ *B21J 9/02* (2013.01); *B21J 13/04* (2013.01); *F16M 1/00* (2013.01); *F16M 1/08* (2013.01); *F16M 11/00* (2013.01); *F16M 11/22* (2013.01)

(58) Field of Classification Search
CPC .... B21K 1/08; B21K 29/00; B21J 9/02; B21J 13/04; F16M 1/00; F16M 1/08; F16M 11/00; F16M 11/22
See application file for complete search history.

(56) References Cited

U.S. PATENT DOCUMENTS 3,907,170 A * 9/1975 Schedrin ................ B05B 7/1431
406/47
5,681,367 A * 10/1997 Hunter .................... C21B 13/14
75/10.48

(Continued)

*Primary Examiner* — Amy J. Sterling
(74) *Attorney, Agent, or Firm* — Christopher J. Dynowski; Ryan W. Dupuis; Ade & Company Inc.

(57) ABSTRACT

A kit for forming a forge table and a forge pot for use therewith to carry a fuel for combustion so as to generate heat for heating a metallic workpiece. The forge table includes a tabletop with a central opening for receiving the forge pot. The forge pot includes a container for supporting the fuel and an air chamber fluidically communicated with the container and including an opening for fluidic communication with an external airflow source which generates an airflow for subsequent conveyance to the container for combusting the fuel. Each kit comprises interconnectable components made from rigid non-combustible sheet material. The airflow source is mounted in fluidic communication with the chamber and there is provided an intermediary valve component supported on the same mounting pegs carrying the source that is movably supported on the pegs so as to be operable to control passage of the airflow to the chamber.

20 Claims, 12 Drawing Sheets

(51) Int. Cl.
*B21J 13/04* (2006.01)
*F16M 1/00* (2006.01)
*F16M 1/08* (2006.01)
*F16M 11/22* (2006.01)

(56) References Cited

U.S. PATENT DOCUMENTS

| | | | | |
|---|---|---|---|---|
| 8,381,563 | B2* | 2/2013 | De Souza | B21K 29/00 |
| | | | | 72/342.7 |
| 9,557,109 | B2* | 1/2017 | Tetsumoto | C21B 13/026 |
| 2012/0193842 | A1* | 8/2012 | Tetsumoto | C21B 13/12 |
| | | | | 266/144 |

* cited by examiner

KIT COMPRISING COMPONENTS MADE FROM PLANAR SHEET MATERIAL FOR FORMING FORGE TABLE AND FORGE POT, AND VALVE COMPONENT FOR SELECTIVELY COMMUNICATING AIRFLOW SOURCE AND FORGE POT

This applications claims the benefit of Canadian patent application ser. no. 3,038,315 filed Mar. 28, 2019 and, under 35 U.S.C. 119(e), that of U.S. Provisional application Ser. No. 62/851,311 filed May 22, 2019.

FIELD OF THE INVENTION

The present invention relates generally to a forge which includes a forge table for carrying a forge pot in which a fuel for combustion can be supported so as to generate heat for heating a metallic workpiece, and more particularly to a kit of components which can be assembled to form the forge table and the forge pot. The present invention also relates to a valve arrangement for selectively communicating an airflow source mounted to a tuyere of the forge pot.

BACKGROUND

Recently there has been a resurgence in the popularity of blacksmithing; however, this art remains somewhat restricted to individuals who have access to forges which are difficult to obtain as, typically, generally antique forges are used.

SUMMARY OF THE INVENTION

According to an aspect of the invention there is provided a kit for forming a forge table having a plurality of legs and a tabletop supported by the legs for carrying a forge pot in which a fuel for combustion can be supported so as to generate heat for heating a metallic workpiece, the kit comprising:

a tabletop component made from rigid non-combustible planar sheet material for forming the tabletop of the forge table, the tabletop component defining a central opening for receiving the forge pot in the tabletop component;

a plurality of leg components made from rigid non-combustible planar sheet material for forming the legs of the forge table;

each leg component having a top, a bottom opposite to the top adapted for engaging a support surface, and opposite sides extending between the top and the bottom;

each one of a plurality of pairs of the leg components being interconnectable in a paired condition to form the legs of the forge table, in the paired condition a first one of the pair of the leg components and a second one thereof being arranged (i) generally side by side, so that the tops of the first and second leg components are beside each other and the bottoms thereof are beside each other, and (ii) in transverse orientation relative to one another so that the formed leg of the forge table is generally V-shaped from one of the sides of the first leg component, which is distal to the second leg component, to one of the sides of the second leg component, which is distal to the first leg component; and for each pair of the leg components interconnectable in the paired condition, at least one of the first and second leg components being connectable at a spaced location from the bottom thereof to the tabletop component in a manner such that a plane defined by the tabletop component is oriented transversely to both a plane defined by the first leg component and a plane defined by the planar second leg component, so that, in an assembled condition of the kit in which the tabletop component and the pairs of the leg components arranged in the paired condition are interconnected, the leg components are arranged to stand upwardly from the support surface and to carry the tabletop component in generally horizontal orientation at a spaced height above the support surface.

This arrangement provides a kit of components, in respect of a forge table, which in an unassembled state are easily portable as they can be packed flat and shipped in this condition to an end user who can assemble the kit.

Preferably, the tabletop component has an inner periphery delimiting the central opening and a rectilinear outer periphery comprising a plurality of substantially straight peripheral edges, and each leg component is sized in width from one side to the other substantially equal to a length of a corresponding one of the peripheral edges, so that when interconnected to the tabletop component the leg components collectively span from one side of each leg component to the other side thereof the outer periphery of the tabletop component. Thus each leg component is arranged to form with other ones of the leg components an adjacent pair of the legs of the forge table.

Preferably, each leg component extends generally in an arch shape from the bottom thereof at one of the sides of the leg component to the bottom thereof at the other one of the sides so as to include at least two bottom edges at the bottom of the leg component, one of the bottom edges generally at each side of the leg component, for engaging the support surface. This not only reduces the mass of the leg component while not affecting interconnectability of the leg component with other leg components to form the adjacent pair of table legs but also provides access to a lower portion of the forge pot beneath the tabletop component from the side of the forge table.

Preferably, the leg components each have an inner face arranged for facing generally towards the central opening and the forge pot and an opposite outer face, and, in the assembled condition, the outer periphery of the tabletop component is in abutment with the inner faces of the leg components interconnected thereto such that the tabletop component is confined in fixed location by the leg components interconnected to each other and to the tabletop component. This provides for a substantially rigid structure.

Preferably, in the assembled condition, the leg components extend above the tabletop component to the tops of the leg components which are spaced above an upper surface of the tabletop component arranged to face upwardly, so as to collectively form an annular upstanding flange substantially encompassing the tabletop component.

Preferably, for each pair of the leg components interconnectable in the paired condition, the first leg component includes at its periphery projecting tabs which are adapted to be received in closed slots defined in the second leg component for interconnecting in the paired condition.

Preferably, the tabletop component includes male-type connection elements which are matably receivable in female-type connection elements defined by respective ones of the pairs of the leg components, which are interconnectable with the tabletop component, for interconnecting in the assembled condition, and each one of a first pair of the leg components which are located diametrically opposite to one another in the assembled condition include male-type connection elements which are matably receivable in female-type connection elements defined by each one of a second pair of the leg components which in the assembled condition are located in diametrically opposite relation to one another and crosswise to the opposite relation of the first pair of the leg components.

Preferably, the tabletop component includes a plurality of the male-type connection elements, which is arranged for connecting with a plurality of the female-type connection elements defined by each one of the first diametrically opposite pair of the leg components, and a single one of the male-type connection element arranged for connecting with a corresponding one of the female-type connection element of each one of the second diametrically opposite pair of the leg components.

Preferably, the male-type connection elements of the tabletop component and the leg components are projecting tabs located at peripheries thereof and the female-type connection elements of the leg components are slots.

Preferably, the single male-type connection element of the tabletop component is a projecting tab at the periphery thereof and the corresponding one of the female-type connection element of each one of the second diametrically opposite pair of the leg components is a slot extending from one end of the slot to the other in a direction from one side of the leg component towards the other side, and the top of the leg component defines a downwardly extending cut-out which is in communication with a central portion of the slot so as to leave the ends of the slot as closed in order to resist against upward lifting of the single tab out of the slot and so as to form, in the assembled condition, an extension of an upwardly-facing upper surface of the tabletop component on the single tab which is cantilevered beyond the leg component.

According to another aspect of the invention there is provided a kit for forming a forge pot having a container for supporting fuel to be combusted and an air chamber which is fluidically communicated with the container for guiding to the container an airflow from an airflow source for combusting the fuel in the container so as to generate heat for heating a metallic workpiece, the kit comprising:

first and second floor components made from rigid non-combustible planar sheet material each having upper and lower faces, longitudinally opposite ends and laterally opposite sides extending therebetween, the floor components being arrangeable in a floor forming condition to form a bottom of the container of the forge pot on which the fuel can be supported;

in the floor forming condition the first and second floor components being arranged (i) in fixed intimate relation to one another, (ii) generally side by side, so that a first one of the ends of the first floor component is beside a first one of the ends of the second floor component and a second one of the ends of the first floor component is beside a second one of the ends of the second floor component, and (iii) in transverse relation to one another, with the upper faces of the floor components facing generally upwardly, such that the bottom of the container is generally V-shaped from one of the sides of the first floor component, which is distal to the second floor component, to one of the sides of the second floor component, which is distal to the first floor component, the bottom of the container including a longitudinally extending bottom vertex and defining an angle less than 180 degrees between the upper surfaces of the floor components;

in the floor forming condition the first and second floor components defining an airflow opening for permitting air to pass from below the bottom of the container and above thereof;

first and second wall components made from rigid non-combustible planar sheet material each having a top and a bottom, the first and second wall components each being connectable at an adjacent pair of the ends of the first and second floor components arranged in the floor forming condition in a manner such that a plane defined by the wall component is oriented transversely to both a plane defined by the first floor component and a plane defined by the second floor component, and so that the top of the wall component is located spaced above the bottom vertex formed by the first and second floor components in the floor forming condition, so as to form end walls of the container of the forge pot enclosing the bottom of the container at either adjacent pair of the ends of the first and second floor components arranged in the floor forming condition;

first and second tuyere components made from rigid non-combustible planar sheet material each having a top, a bottom and opposite sides extending therebetween, the first and second tuyere components being arrangable in a tuyere forming condition in which, relative to the first and second floor components arranged in the floor forming condition, the first and second tuyere components are arranged (i) in fixed location under the floor components with the top of each of the first and second tuyere components in intimate relation with the lower face of one of the first and second floor components, (ii) in a manner such that a plane defined by each of the first and second tuyere components is oriented transversely to the plane defined by the floor component with which the top of the tuyere component is disposed in intimate relation, (iii) in a manner such that each of the first and second tuyere components extends from one of its sides to the other in a generally longitudinal direction of one of the floor components, and (iv) on either side of the airflow opening, so as to generally form a duct underneath the floor components, which is arranged to be closed at either proximal pair of sides of the first and second tuyere components, for guiding the airflow to the airflow opening;

a gate component made from rigid non-combustible planar sheet material having opposite ends and opposite sides extending therebetween, the gate component being arrangeable, relative to the floor components arranged in the floor forming condition and the tuyere components arranged in the tuyere forming condition, (i) at a fixed location spaced below the floor components, so as to be spaced below the airflow opening, and (ii) in a manner so as to extend from one of its sides to the other generally between the tuyere components at a spaced location from their tops, so as to close the duct at a location opposite the airflow opening so as to form with at least the first and second tuyere components the air chamber of the forge pot; and a chamber opening defined in the first tuyere component for fluidically communicating the airflow source with the air chamber so that the airflow therefrom can pass through the air chamber and through the airflow opening to the container of the forge pot.

This arrangement provides a kit of components, in respect of a forge pot, which in an unassembled state are easily portable as they can be packed flat and shipped in this condition to an end user who can assemble the kit.

Preferably, the first and second wall components are sized and shaped in a manner such that, when the wall components are connected to the adjacent pairs of the ends of the floor components arranged in the floor forming condition, the wall components extend from their tops above the bottom vertex to their bottoms which are located below the bottom vertex and at the sides of the tuyere components, and further the first and second wall components are arranged to be connectable to the tuyere components in the tuyere forming condition so as to support the tuyere components therein, and so as to act to close the duct at either proximal pair of sides of the tuyere components and thus form the air chamber with the tuyere components and the gate component.

In the illustrated arrangement, the wall components are generally T-shaped such that the tuyere components in the tuyere forming condition connected thereto are disposed generally centrally relative to the bottom vertex of the floor components in the floor forming condition.

Preferably, the first and second tuyere components include projecting tabs at their sides which are matably receivable in closed slots defined in the wall components to support the first and second tuyere components in the tuyere forming condition.

In the illustrated arrangement, the first and second floor components arranged in the floor forming condition are supported therein only by the wall components each connected to the adjacent pair of the ends of the floor components, and the first and second floor components are detached from one another at the bottom vertex.

Preferably, the first and second floor components include projecting tabs at their ends which are matably receivable in closed slots defined in the wall components to support the floor components in the floor forming condition.

In the illustrated arrangement, the tops of the first and second tuyere components arranged in the tuyere forming condition are detached from the lower faces of the first and second floor components arranged in the floor forming condition so as not to be connected thereto.

In such arrangements in which the floor components are detached from one another and the tuyere components are detached from the floor components, it is preferable that the first and second wall components are interconnectable by a distinct bridging member arranged to extend through the air chamber generally longitudinally of the bottom vertex but in detached condition to the first and second floor components arranged in the floor forming condition and in spaced relation to the first and second tuyere components arranged in the tuyere forming condition so as to hold the wall components, connected at the adjacent ends of the floor components, in fixed relation to one another. This rigidifies the structure.

Preferably, the wall components each include a pair of first mating members for connecting to the floor components and a pair of second mating members for connecting to the tuyere components, and the bridging member is connected to each wall component at a location below the first mating members but above the second mating members.

Preferably, the first and second mating members are slots.

In arrangement including the bridging member, preferably there is provided a plurality of the airflow opening in the floor components arranged in the floor forming condition including a first airflow opening defined in the first floor component at a location thereon which is offset from a vertical plane in which the bridging member lies and a second airflow opening defined in the second floor component at a location thereon which is offset from the vertical plane. In this manner, ash generated by the combustion of the fuel supported in the container of the forge pot and passing by gravity through the air chamber is less likely to collect on the bridging member.

Preferably, in an assembled condition in which the forge pot is formed that includes the floor forming condition of the first and second floor components, the wall components being connected to the adjacent pairs of the ends of the floor components in the floor forming condition, the tuyere forming condition of the first and second tuyere components providing the duct and the gate component being supported at the fixed location to close the duct opposite the airflow opening, the duct is arranged such that the gate component is supported for sliding movement in a direction within a plane in which the gate component resides opposite the airflow opening between a closed position in which the air chamber is closed opposite the airflow opening and a dumping position in which the air chamber is open opposite the airflow opening for releasing ash generated by the combustion of the fuel in the container and passing by gravity into the air chamber through the airflow opening.

In an arrangement where the first wall component extends below the bottom vertex of the floor components in the floor forming condition, preferably the first wall component includes a gate slot arranged to slidably receive the gate component displaced in the direction of the sliding movement, and there is provided a support beam connected to the first wall component subjacent the gate slot and extending transversely to the first wall component beneath the gate component so that the support beam and gate slot cooperate to support the gate component in its sliding movement. Thus is provided a simple arrangement for supporting a movable gate for releasing ash from the air chamber.

In an arrangement where the second wall component extends below the bottom vertex of the floor components in the floor forming condition, preferably the support beam interconnects the first and second wall components.

Preferably, each wall component forms hangers at its opposite sides, each in the form of a hook having an upper arm extending generally horizontally outwardly towards a free end of the upper arm and a lower arm depending from the upper arm at an inwardly spaced location from the free end thereof, for supporting the forge pot in substantially fixed location when received in a central opening of a tabletop of a forge table.

Preferably the kit further includes a plurality of mounting pegs each arrangeable relative to the chamber opening to project in a longitudinal direction outwardly from the first tuyere component for mounting the air source in fluidic communication with the chamber opening, and further including a valve component made from rigid non-combustible planar sheet material defining a valve opening for locating intermediate the chamber opening and the air source and at least one slot formed through a thickness of the sheet material and receiving the mounting pegs, the valve component being arranged to be movably supported by the mounting pegs for movement transversely to the pegs between an open position in which the valve opening is aligned with the chamber opening so as to permit passage of the airflow from the air source to the air chamber and an obstructing position in which the valve opening is misaligned with the chamber opening so as to obstruct the airflow from passage to the air chamber through the chamber opening, such that the valve component is operable to selectively obstruct communication of the airflow source and the air chamber.

In the illustrated arrangement, the mounting pegs are arranged in one or more parallel linear rows and the at least one slot receiving the one or more rows of the mounting pegs extends linearly from one end of the slot to the other end so that the valve component is movable between the open and obstructing positions in sliding movement in a direction parallel to the rows.

Preferably, the air source is an electric blower.

According to yet another aspect of the invention there is provided forge pot for use with a forge table to carry a fuel for combustion so as to generate heat for heating a metallic workpiece, comprising:

a container for supporting the fuel to be combusted;

an air chamber fluidically communicated with the container and including a chamber opening for fluidic communication with an external airflow source which is arranged to generate an airflow for subsequent conveyance by the air chamber to the container for combusting the fuel in the container;

a plurality of mounting pegs each affixed relative to the chamber opening at an external location of the air chamber and projecting outwardly from the air chamber in a longitudinal direction for mounting the airflow source in fluidic communication with the chamber opening;

a valve component having a first side, an opposite second side, and defining a valve opening which opens at the first and second sides of the valve component so as to permit passage of air from the first side to the second side through the valve opening;

the valve component being supported on the mounting pegs with its second side at or adjacent the air chamber and the first side distal thereto such that the valve component is connected to the air chamber and is arranged at a location intermediate the air chamber and the airflow source for controlling passage of the airflow from the airflow source to the air chamber;

the valve component being arranged to be movable transversely to the mounting pegs between an open position in which the valve opening is aligned with the chamber opening so as to permit passage of the airflow from the air source to the air chamber and an obstructing position in which the valve opening is misaligned with the chamber opening so as to obstruct the airflow from passage to the air chamber through the chamber opening, such that the valve component is operable to selectively obstruct communication of the airflow source and the air chamber.

This provides a simple arrangement for controlling an amount of the airflow from the source that is admitted to the air chamber so as to control combustion of the fuel while the airflow source is continually operated to generate a constant airflow.

In the illustrated arrangement, the mounting pegs are arranged in one or more parallel linear rows and the valve component is arranged to be movable between the open and obstructing positions in sliding movement in a direction parallel to the rows.

In one arrangement, the valve component is made from rigid non-combustible planar sheet material and further defines at least one slot formed through a thickness of the sheet material measured from the first side to the second side of the valve component, the at least one slot receiving the mounting pegs so as to form a track defining a path of movement between the open and obstructing positions.

Preferably, the air source is an electric blower.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

In the accompanying figures is shown a kit for forming a forge table 12 and a forge pot 14 for use with the forge table which carries the pot. The forge pot 14 supports a fuel such as coal for combustion so as to generate heat for heating a metallic workpiece, for example to the extent that the workpiece is suitably malleable so that it can then be shaped without breaking. The table 12 in turn supports the forge pot. That is, the forge table 12 and pot 14 are separable assemblies though they are used in conjunction with one another for the intended purpose of generating heat for heating the workpiece.

Figure 1:
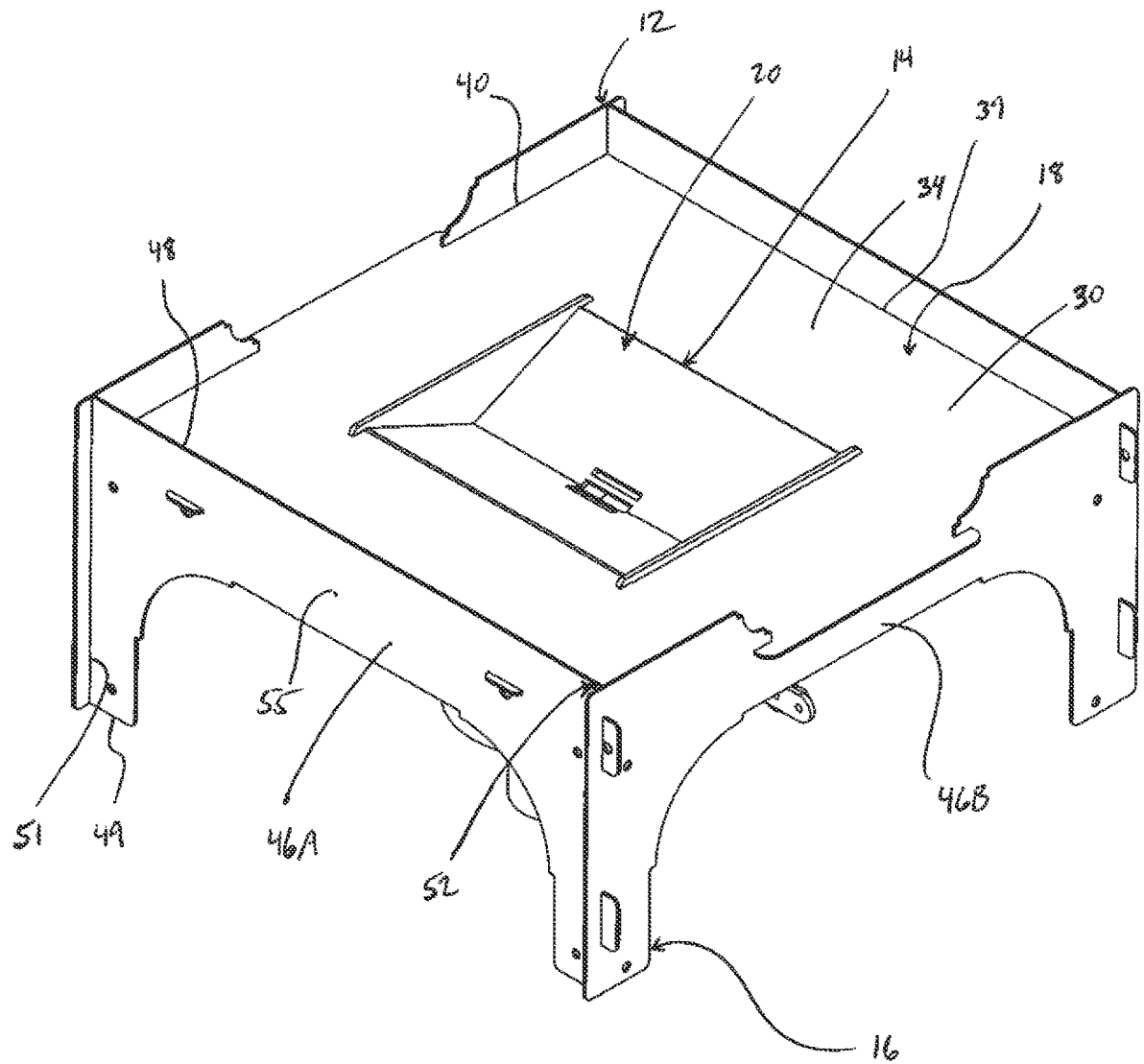
FIG. 1 is a top perspective view of an arrangement of kit for forming a forge table and a forge pot according to the present invention.
Figure 2:
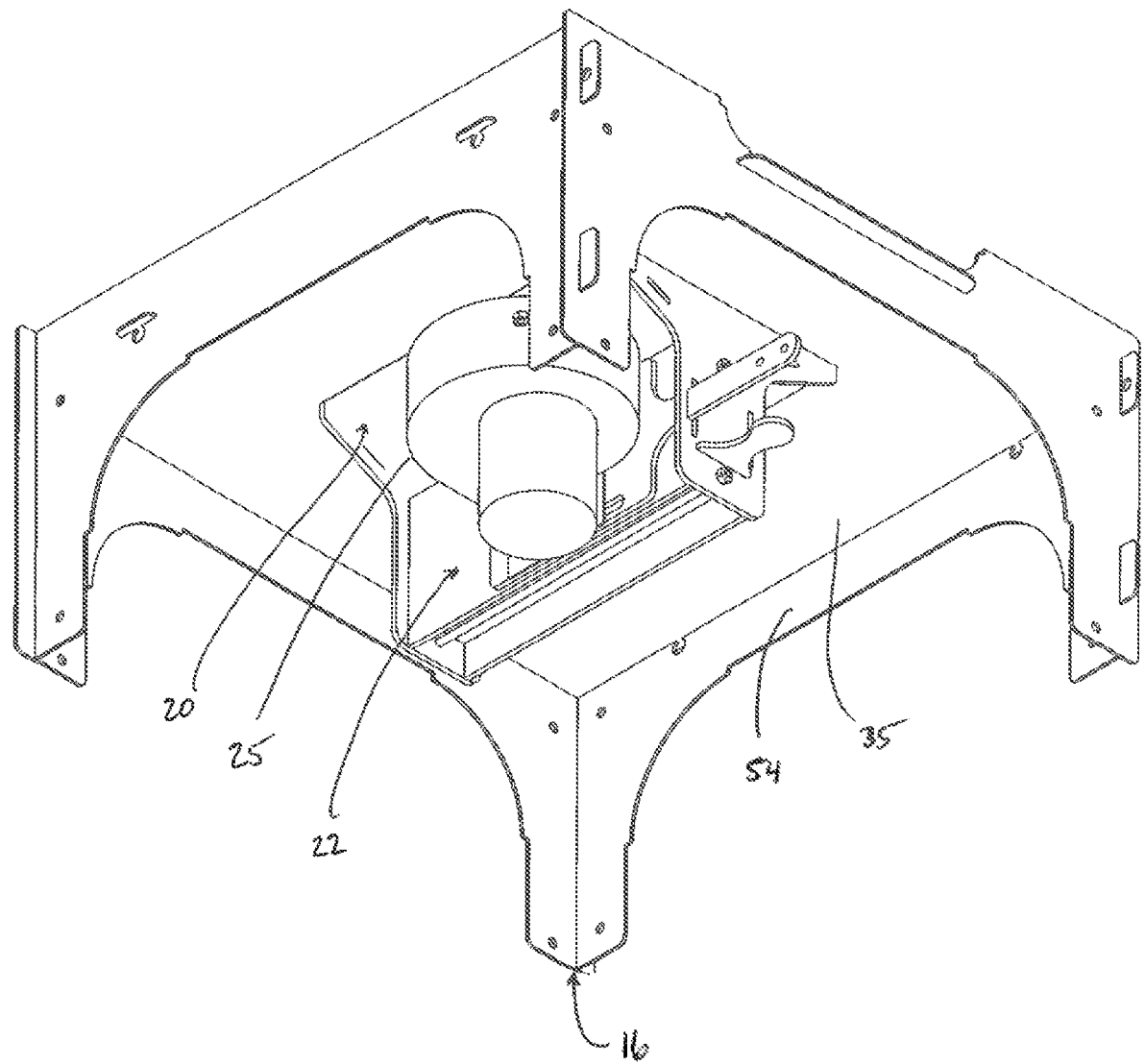
FIG. 2 is a bottom perspective view of the arrangement of FIG. 1.

Generally speaking, and referring to FIGS. 1 and 2, the forge table 12 comprises a plurality of legs 16 and a tabletop 18 supported by the legs 16 for carrying the forge pot 14. The forge pot 14 generally comprises a container 20 for supporting the fuel to be combusted and an air chamber 22 which is fluidically communicated with the container 20 for guiding to the container 20 an airflow from an airflow source 25 for combusting the fuel in the container so as to generate heat for heating the workpiece. The air chamber 22 includes a chamber opening 27 (FIG. 7) for fluidic communication with the external airflow source 25 which is arranged to generate the airflow for subsequent conveyance by the air chamber 22 to the container for combusting the fuel in the container 20.

Figure 3:
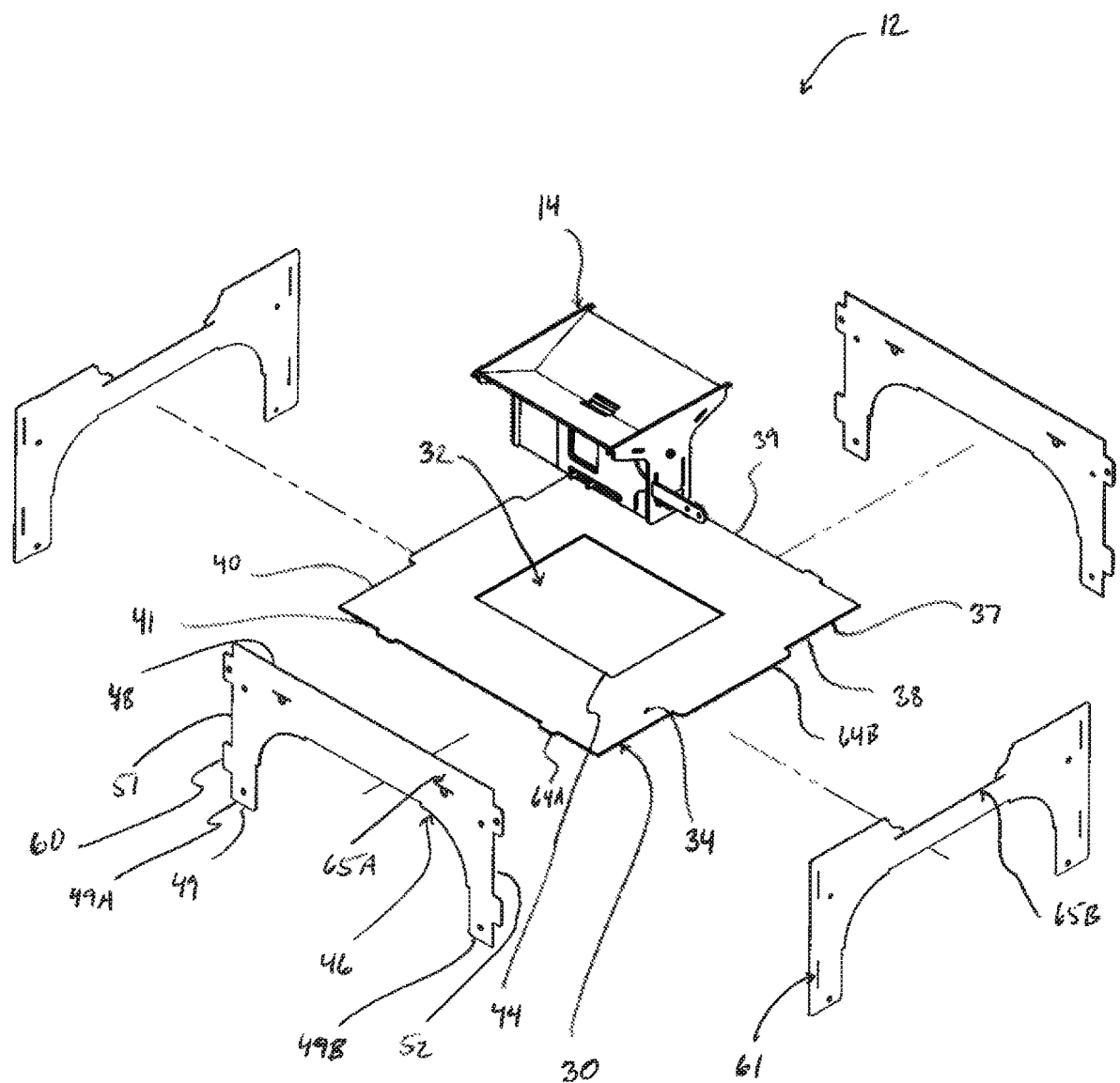
FIG. 3 is an exploded view of the arrangement of FIG. 1.

Referring to FIG. 3, the kit for forming the forge table 12 comprises a tabletop component 30 made from rigid non-combustible planar sheet material, typically a rigid metallic material such as steel, for forming the tabletop 18 of the forge table. The tabletop component 30 defines a central opening 32 for receiving the forge pot 14 in the tabletop component. The tabletop component 30 has opposite first and second faces 34, 35, one of which is arranged facing generally upwardly and the other facing generally downwardly. The opposite faces 34, 35 are separated by a thickness of the sheet material through which is formed the central opening 32. An outer periphery 37 of the tabletop component is generally rectangular in shape, for example square-shaped, so as to be rectilinear and so as to include four substantially straight peripheral edges 38-41, and the central opening 32 is defined by an inner periphery 44 of the tabletop component which also is rectilinear and is rectangular shaped. Thus is provided a single tabletop component which is generally annular shaped and forms a rectangular annulus.

The table kit further includes a plurality of leg components 46 made from rigid non-combustible planar sheet material for forming the legs 16 of the forge table. Each leg component 46 has a top 48, a bottom 49 opposite to the top adapted for engaging a support surface such as a floor or the ground, and opposite sides 51 and 52 extending between the top 48 and the bottom 49. When assembled to form the table, the leg component 46 is oriented substantially upright with the leg top 48 arranged to be located generally at or adjacent the tabletop component 30, the leg bottom 49 in contact with the support surface, and at least one of the sides 51, 52 is facing a side of another one of the leg components or is located generally at or adjacent thereto. Each leg component 46 also includes a pair of opposite faces 54, 55, one of which is arranged to face inwardly generally towards the forge pot and the other which is arranged to face outwardly. The faces 54, 55 are separated by a thickness of the sheet material.

The leg components 46 are arranged in pairs and a plurality of pairs of leg components are formed, with legs components of each pair being interconnectable in a paired condition to form the legs 16 of the forge table. Referring to FIGS. 1 and 2, in the paired condition, and with respect to each pair of leg components, a first leg component 46A of the pair and a second leg component 46B thereof are arranged (i) generally side by side, so that the tops 48 of the first and second leg components 46A, 46B are beside each other, that is the top 48 of the first leg component 46A is located next to but to one side of the top of the second leg component 46B, and the bottoms 49 of the first and second leg components are beside each other, and (ii) in transverse orientation relative to one another so that the formed leg 16 of the forge table is generally V-shaped from one of the sides 51 of the first leg component 46A, which is distal to the second leg component 46B, to one of the sides 52 of the second leg component 46B, which is distal to the first leg component. That is, in the paired condition, basically the first and second leg components 46A, 46B form an angle less than 180 degrees between the inner faces 54 and thus this includes the possibility that the paired leg components 46A, 46B are arranged in T-shaped relation to one another as in the illustrated arrangement where the side 52 of the first leg component 46A is located at or adjacent the inner face 54 of the second leg component 46B.

In order to connect the paired interconnected leg component pair to the tabletop component 30, at least one of the first and second leg components 46A, 46B of the pair is connectable at a spaced location from the bottom 49 thereof to the tabletop component 30 in a manner such that a plane defined by the tabletop component 30 is oriented transversely to both a plane defined by the first leg component 46A and a plane defined by the planar second leg component 46B, so that, in an assembled condition of the table kit in which the tabletop component 30 and the pairs of the leg components 46 arranged in the paired condition are interconnected, the leg components 46 are arranged to stand upwardly from the support surface and to carry the tabletop component 30 in generally horizontal orientation at a spaced height above the support surface. In the illustrated arrangement, both the first and second components 46A, 46B of the pair couple to the tabletop component 30 which improves rigidity of the assembled table, that is, the degree of fixedness of the relation of one component relative to the other, and the stability of the assembled table. In the illustrated arrangement, both the first and second component of the paired leg components connect to the tabletop component for added structural strength.

Figure 4:
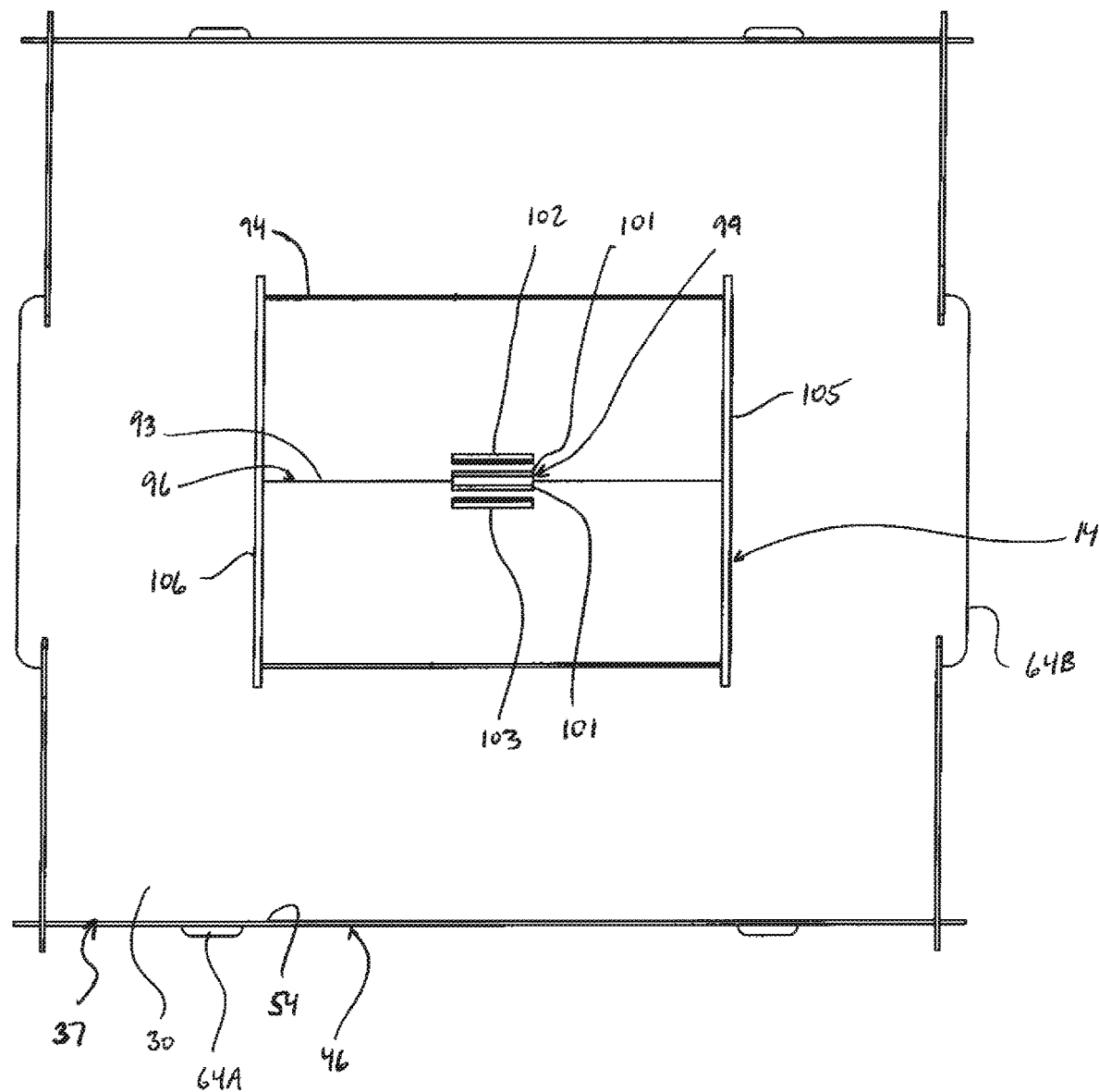
FIG. 4 is a top plan view of the arrangement of FIG. 1.

Referring to FIG. 4, each leg component 46 is sized in width from one side 51 to the other 52 substantially equal to a length of a corresponding one of the peripheral edges of the tabletop component such as edge 38 so that when interconnected to the tabletop component 30 the leg components 46 collectively span from one side of each leg component to the other side thereof the outer periphery 37 of the tabletop component. Thus each leg component is arranged to form with two other ones of the leg components an adjacent pair of the legs of the forge table.

Figure 5:
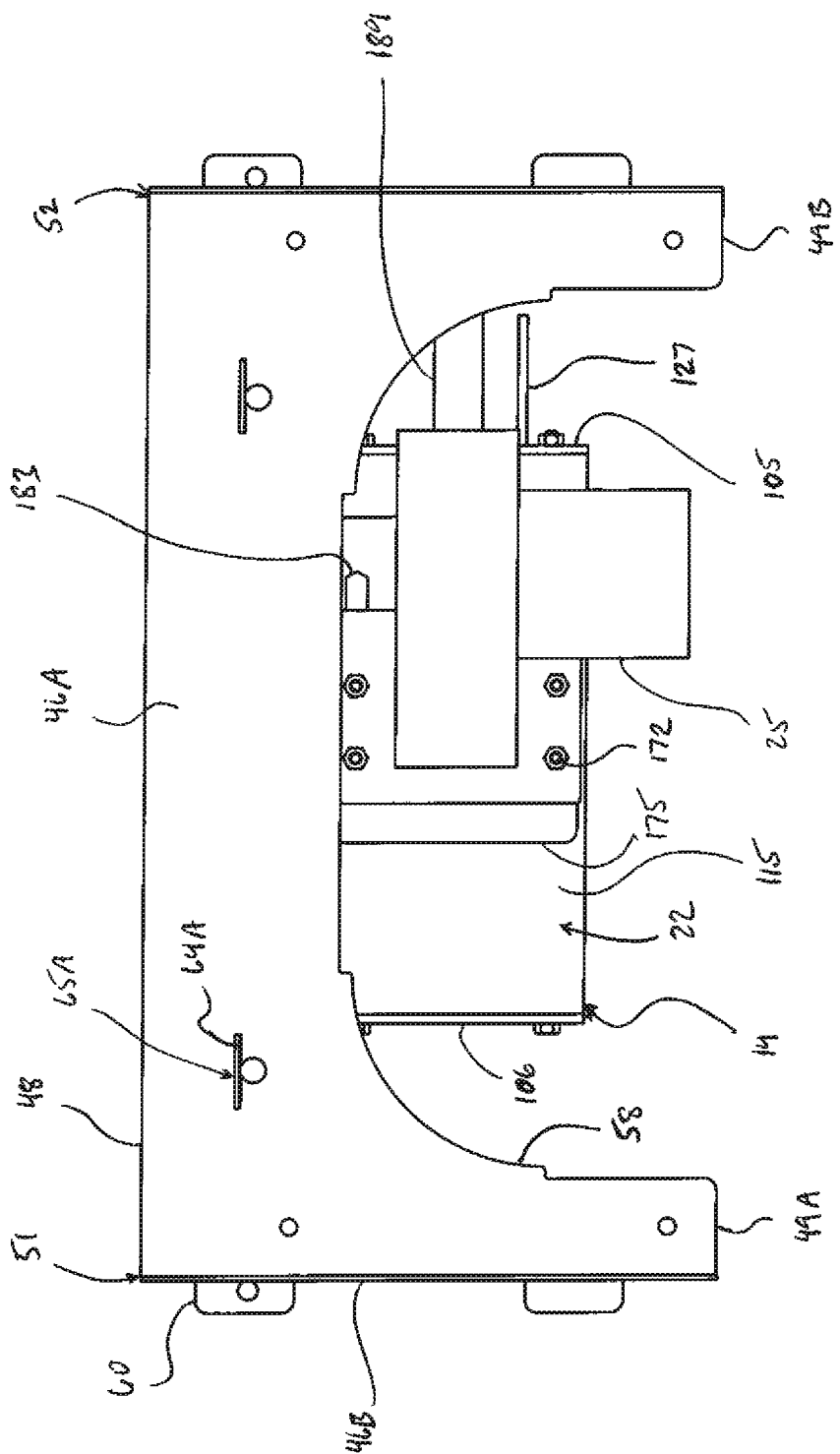
FIG. 5 is a side elevational view of the arrangement of FIG. 1.
Figure 6:
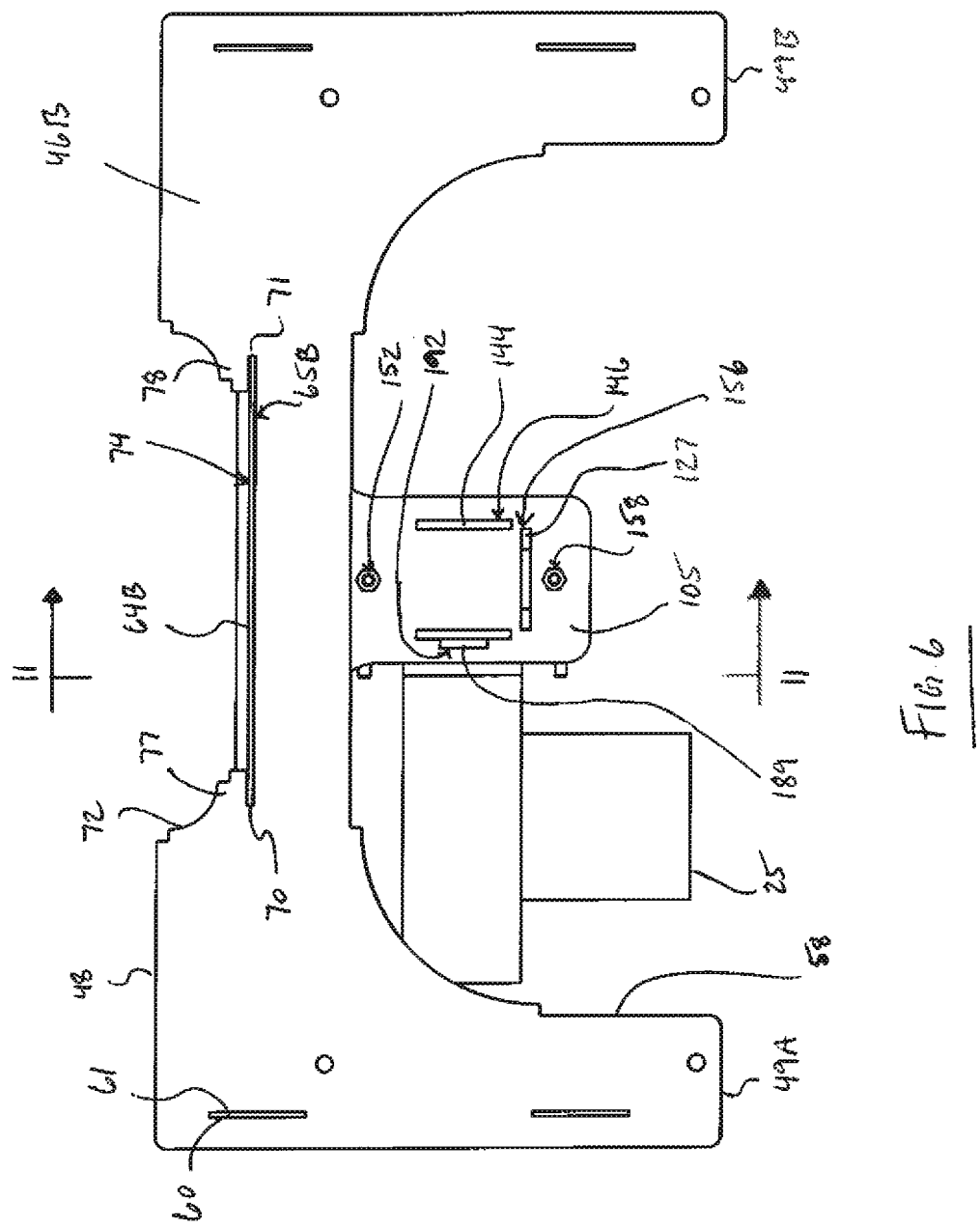
FIG. 6 is an end elevational view of the arrangement of FIG. 1.

As shown more clearly in FIGS. 5 and 6, each leg component 46 extends generally in an arch shape from the bottom 49 thereof at one of the sides 51 of the leg component to the bottom thereof at the other one of the sides 52 so as to include at least two bottom edges 49A, 49B at the bottom of the leg component, one of the bottom edges generally at each side of the leg component, for engaging the support surface. As such, each leg component 46 can be formed from a generally rectangular rigid sheet of metal in which is formed an arcuate cut-out defining a generally arcuate bottom edge 58 bridging from one of the bottom edges 49A across the width of the leg component and to the other bottom edge 49B. This not only reduces the mass of the leg component while not affecting its interconnectability with other leg components to form the adjacent pair of table legs but also provides access to a lower portion of the forge pot 14 beneath the tabletop component 30 from the side of the forge table.

When the leg components are arranged to collectively span the outer periphery 37 of the tabletop component in the assembled condition, the outer periphery 37 of the tabletop component is located in abutment with the inner faces 54 of the leg components 46 interconnected thereto such that the tabletop component 30 is confined in fixed location by the leg components interconnected to each other and to the tabletop component. In other words, the interconnected leg components form a closed annulus within which the tabletop component 30 is snugly located such that movement in directions in the plane of the tabletop component is substantially restricted. This provides for a substantially rigid structure.

Furthermore, as more clearly shown in FIGS. 1 and 2, in the assembled condition the leg components 46 extend above the tabletop component 30 to the tops 48 of the leg components which are spaced above the upper surface 34 of the tabletop, so as to collectively form an annular upstanding flange substantially encompassing the tabletop component 30. Such raised edging acts to contain fuel which may inadvertently spill out of the container 20 of the forge pot.

In order to facilitate interconnection of the leg components 46A, 46B in the paired condition, for each pair the first leg component 46A includes at its periphery male-type connection elements in the form of projecting tabs 60 which are adapted to be received in female-type connection elements in the form of closed slots 61 defined in the second leg component 46B for interconnecting in the paired condition. The tabs 60 lie in a common plane as a remainder of the leg component 46A and are located at opposite sides 51, 52 of the leg component. Each slot 61 is closed around its full periphery so as to be wholly spaced from a periphery of the leg component 46B. As each leg component is sized in side-to-side width so as to span the corresponding peripheral edge of the tabletop component at which it is located, in the illustrated arrangement there are basically two of the first-type of leg component 46A and two of the second-type of leg component 46B, and the second leg components 46B are wider than the first leg components 46A so as to provide a suitable surface area in which to define the slots 61. The second leg components 46B therefore extend beyond the outer faces 55 of the first leg components 46A. Furthermore, as the leg components are oriented generally upright in the assembled condition of the table, the slots each extend from one end of the slot to the other in a direction generally from the top 48 towards the bottom 49 of the leg component.

Turning now to interconnection of the tabletop component and the leg components, the tabletop component 30 includes male-type connection elements 64A, 64B which are matably receivable in female-type connection elements 65A, 65B defined by respective ones of the pairs of the leg components 46, which are interconnectable with the tabletop component, for interconnecting in the assembled condition. In such an arrangement, each one of a first pair of the leg components which are located diametrically opposite to one another in the assembled condition, which in the illustrated arrangement are the first type of leg components 46A, include male-type connection elements 60 which are matably receivable in female-type connection elements 61 defined by each one of a second pair of the leg components which in the assembled condition are located in diametrically opposite relation to one another and crosswise to the opposite relation of the first pair of the leg components, that is the second type of leg components 46B. That is, the male-type connection elements generally form insertion elements which are matably insertible in receptacles formed by the female-type connection elements. Therefore this arrangement can forgo brackets or other interconnection elements which are separate from the leg components or the tabletop component in favour of connection elements which are integral or unitary with the main body components of the table. It will be appreciated that in the illustrated arrangement each leg component 46 includes the female-type connection element 65 as each leg component connects to the tabletop component 30 for increased rigidity.

The male-type connection elements of the tabletop component, which are indicated at 64, and that of the leg components, indicated at 60, are projecting tabs located at peripheries of these components and lying in a common plane with a remainder of the component. The female-type connection elements of the leg components, that is either those indicated at 61 or at 65, are slots. The slots are sized and shaped so as to generally snugly receive the tabs so as to cooperate therewith to form a mating interconnection of the male and female-type connection elements in which movement transverse to the plane of each if the interconnected members is restricted such that the interconnected components are held in fixed transverse relation to one another. Retention elements (not shown) in the form of removably attachable members which are oversized relative to the slots may be provided for attachment to the tabs when passed through the slots, such that the slot-defining or slotted component is located between the tab-defining or tabbed component and the retention element, so as to secure the components in their interconnected condition. For example, the retention elements may be closed loops which are removably attachable to eyelets formed in the tabs.

In the illustrated arrangement, the tabletop component 30 includes a plurality of the male-type connection elements 64A for connecting with a plurality of the female-type connection elements 65A defined by each one of the first diametrically opposite pair of the leg components 46A and a single one of the male-type connection 64B element for connecting with a corresponding one of the female-type connection element 65B of each one of the second diametrically opposite pair of the leg components 46B. The male-type connection elements 64A of the tabletop component located at spaced positions along edges 39 and 41 for cooperation with the first type of leg components 46A are generally much smaller in width between opposite sides which extend from the free end of the male-type element to the periphery of the tabletop component 30 than the single male-type connection element 64B which cooperates with each of the second type leg components 46B. The slots 65A are closed and extend from one end of the slot to the other in a direction generally from one side of the leg component 46A to the other side, so that in the assembled condition these slots are oriented generally horizontally as is the tabletop component.

The single slot 65B defined by the second type of leg component 46B extends from one end 69 of the slot to the other 70 in a direction from one side 51 of the leg component towards the other side 52, and the top 48 of the leg component 46B defines a downwardly extending cut-out 72 which is in communication with a central portion 74 of the slot so as to leave the ends 70, 71 of the slot as closed in order to resist against upward lifting of the single tab 64 out of the slot 65 and so as to form, in the assembled condition, an extension of an upwardly-facing upper surface 34 of the tabletop component on the single tab 64B which is cantilevered beyond the leg component 46B. By the cut-out 72 there is formed, collectively with the slot 65B, opposite inwardly extending fingers 77, 78 disposed in the plane of the leg component 46B which resist against upward movement of the projecting tab 64B out of the slot 65B. As the single tab 64B is spans approximately half of the length of peripheral edge 38, there is provided thereby a considerable extension to the upper surface 34 which is communicated with surroundings of the table via the cut-out 72. The cut-out 72 is sized in width from one side 72A of the cut-out to the other 72B greater than half of the length of the slot 65B measured between its ends 69, 70 so that a majority of the extended tabletop upper surface 34 on the tab 64B is relatively accessible from the upper surface located within boundary delimited by the surrounding flange. The tab 64B may therefore serve as a suitable mounting location for a receptacle such as a water basin (not shown) for holding water to quench a heated metallic workpiece which is in direct communication with the upper surface of the tabletop component for example by simply sliding the workpiece from the forge pot 14 to the basin without lifting over the surrounding flange.

To assemble the forge table 12, typically the first type of leg components 46A are located in diametrically opposite positions at corresponding peripheral edges 39, 41 of the tabletop component which can be readily identified by the number of male-type connection elements along that edge. With the leg components 46A generally affixed to the tabletop component 30, the second type of the leg components 46B may be located in diametrically opposite positions at corresponding peripheral edges 38, 40 of the tabletop component which again are readily identifiable by the presence of a single connection element. The second type of leg component 46B is generally simultaneously coupled with opposite first leg components 46A and with the tabletop component 30. Thus is formed the forge table which can receive the forge pot in the central opening 32.

Thus is provided a kit of components, in respect of a forge table, which in an unassembled state are easily portable as they can be packed flat and shipped in this condition to an end user who can assemble the kit.

Figure 7:
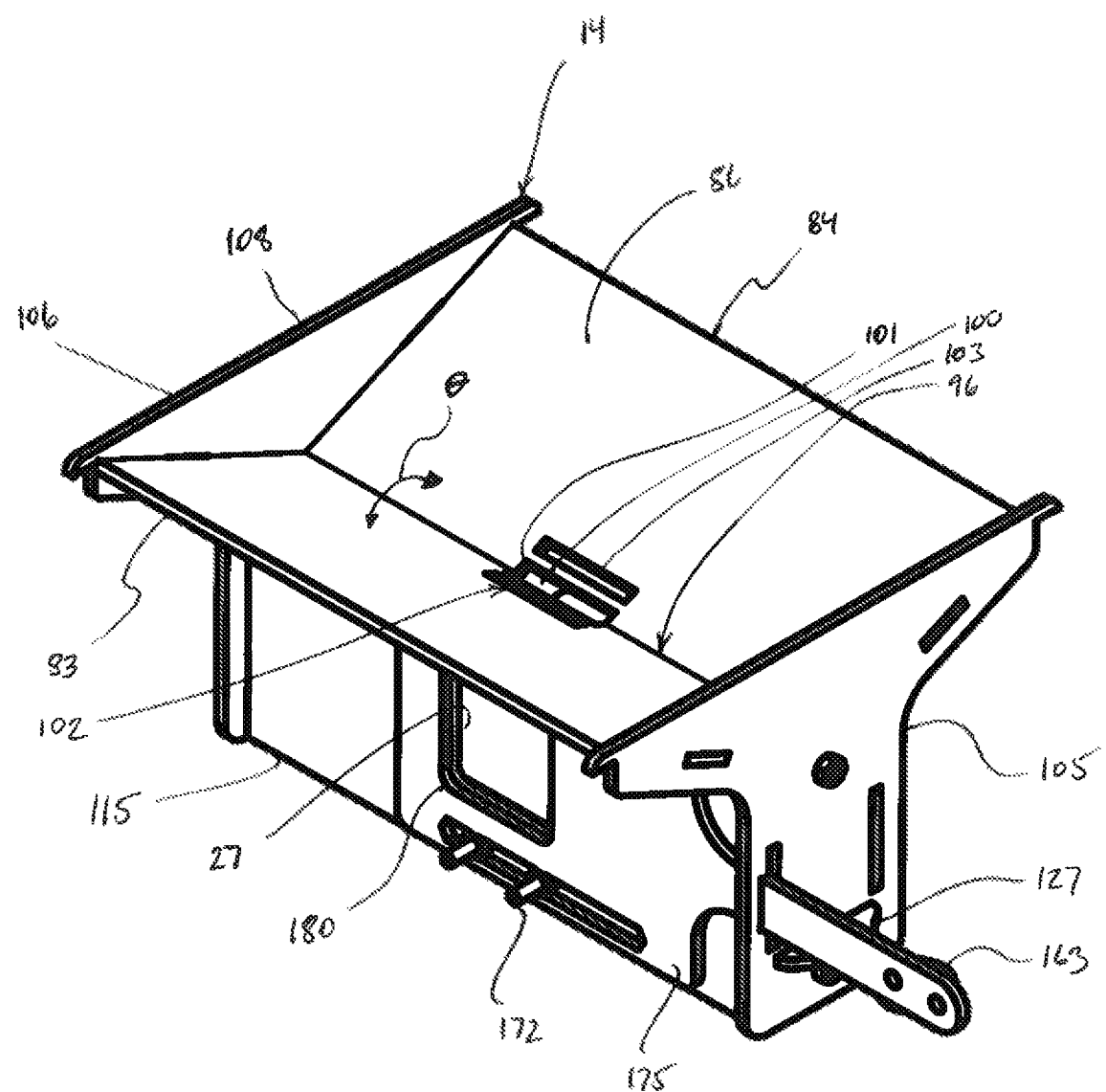
FIG. 7 is a perspective view of an arrangement of kit for forming a forge pot as shown in FIG. 1.
Figure 8:
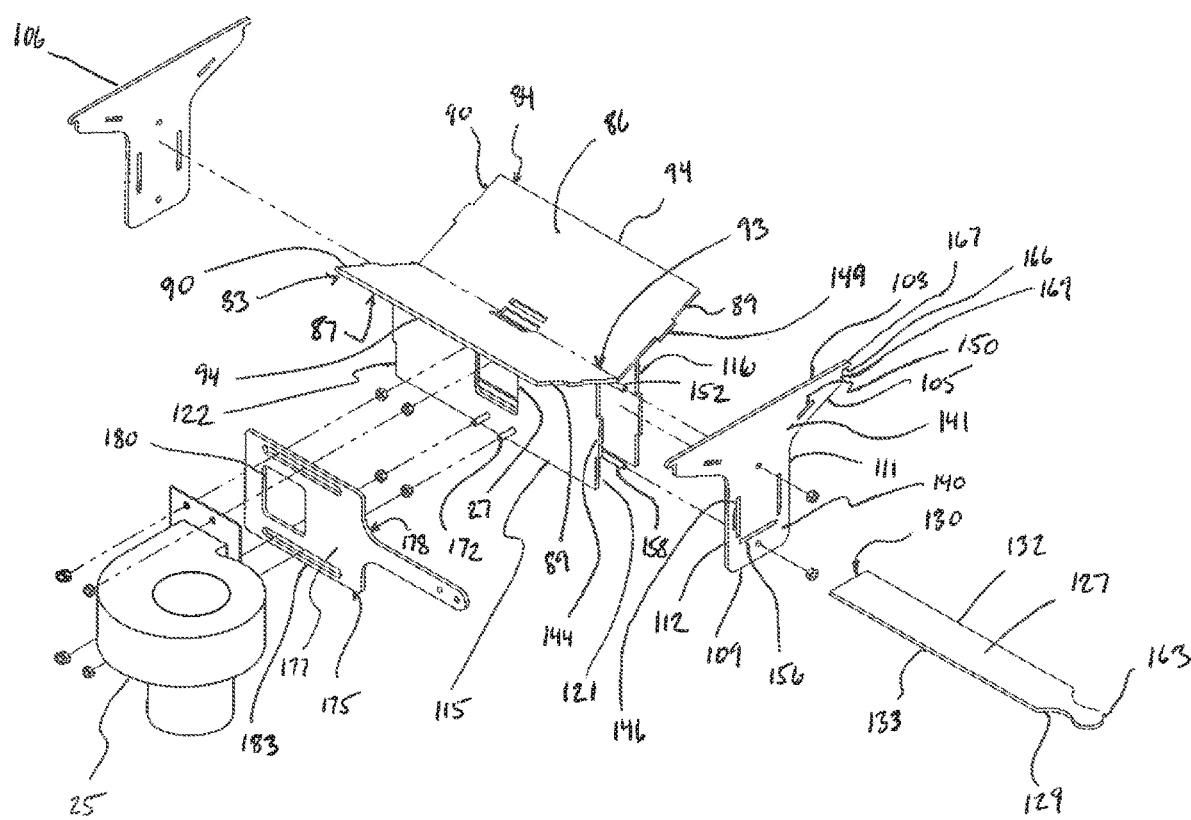
FIG. 8 is an exploded view of the arrangement of FIG. 7.
Figure 9:
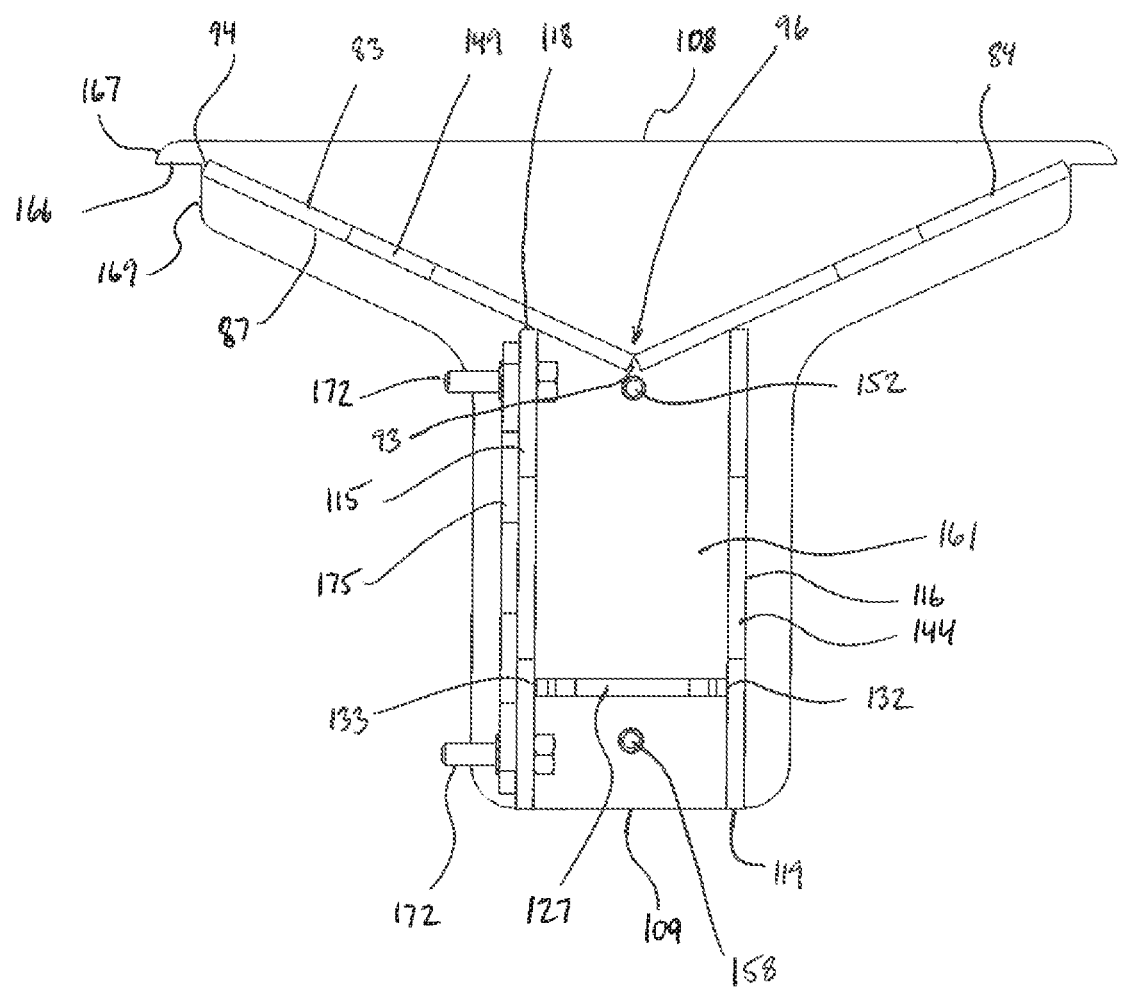
FIG. 9 is an end view of the distal end of the arrangement of FIG. 7 with a wall component removed for clarity of illustration.

Turning now to the forge pot 14, and referring to FIGS. 7-9, a kit for forming the forge pot comprises first and second floor components 83, 84 made from rigid non-combustible planar sheet material each having upper and lower faces 86 and 87, longitudinally opposite ends 89, 90 and laterally opposite sides extending therebetween 92 and 93. The floor components 83, 84 are arrangeable in a floor forming condition as shown more clearly in FIG. 9 to form a bottom of the container 20 of the forge pot on which the fuel can be supported.

In the floor forming condition, the first and second floor components are arranged (i) in fixed intimate relation to one another, (ii) generally side by side, so that a first end 89 of the first floor component 83 is beside a first end 89 of the second floor component 84 and a second end 90 of the first floor component is beside a second end 90 of the second floor component 84, and (iii) in transverse relation to one another, with the upper faces 86 of the floor components facing generally upwardly, such that the bottom of the container is generally V-shaped from one side 94 of the first floor component 83, which is distal to the second floor component 84, to one of the sides 94 of the second floor component 84, which is distal to the first floor component 83. The bottom of the container includes a longitudinally extending bottom vertex 96 and defines an angle θ less than 180 degrees between the upper surfaces 86 of the floor components. Generally speaking, an angle θ is greater than 90 degrees and preferably between 140-170 degrees is suitable so as to form a trough of sufficient depth measured upwardly from the vertex 96 to contain the fuel. It will also be appreciated that, in the illustrated arrangement, proximal sides 93 of the floor components are arranged adjacent one another in the transverse relation of one floor component to the other, and the floor components 83, 84 are substantially rectangular shaped such that the opposite sides 93, 94 are parallel to one another and so too are the opposite ends 89, 90 in relation to one another. The floor components are arranged sufficiently close to one another in the intimate relation of the floor forming condition that non-combusted fuel does not fall through at the bottom vertex 96.

Furthermore, in the floor forming condition as described above, the first and second floor components 83, 84 define an airflow opening 100 for permitting air to pass from below the bottom of the container and above thereof, such that the container bottom with the opening forms a grate. More specifically, as more clearly shown in FIG. 4 each of the floor components 83, 84 include a cut out defined 101 in the proximal side 93 thereof which is in longitudinal alignment with the cut-out of the other floor component so as to collectively define an airflow opening once the floor components are positioned in the floor forming condition. There are also provided additional airflow openings 102, 103, one formed through a thickness of each floor component at a spaced location from the side 93 as will be described in further detail shortly.

The kit additionally includes first and second wall components 105, 106 made from rigid non-combustible planar sheet material each having a top 108 and a bottom 109. Generally speaking, the wall components each also have opposite sides 111 and 112 interconnecting the top 108 and bottom 109 thereof. The first and second wall components 105, 106 each are connectable at an adjacent pair of the ends 89, 89 or 90, 90 of the first and second floor components 83, 84 arranged in the floor forming condition in a manner such that a plane defined by the wall component 105 or 106 is oriented transversely to both a plane defined by the first floor component 83 and a plane defined by the second floor component 84, and so that the top 108 of the wall component is located spaced above the bottom vertex 96 formed by the floor components in the floor forming condition, so as to form end walls of the container 20 of the forge pot enclosing the bottom of the container at either adjacent pair of the ends 89, 89 or 90, 90 of the first and second floor components. As such, the wall components 105, 106 are arranged in a wall forming condition in which they form, at least, the end walls of the container 20 of the forge pot at either end of the container bottom which is in the form of a trough and formed by the floor components 83, 84 arranged in the floor forming condition.

Furthermore, the forge pot kit includes first and second tuyere components 115, 116 made from rigid non-combustible planar sheet material each having a top 118, a bottom 119 and opposite sides 121, 122 extending therebetween. Referring to FIGS. 8 and 9, the first and second tuyere components 115, 116 are arrangeable in a tuyere forming condition in which, relative to the first and second floor components 83, 84 arranged in the floor forming condition, the first and second tuyere components 115, 116 are arranged (i) in fixed location under the floor components 83, 84 with the top 118 of each of the tuyere components 115, 116 in intimate relation with the lower face 87 of one of the floor components, (ii) in a manner such that a plane defined by each of the first and second tuyere components 115, 116 is oriented transversely to the plane defined by the floor component 83 or 84 with which the top 118 of the tuyere component is disposed in intimate relation, (iii) in a manner such that each of the tuyere components 115, 116 extends from one side 121 to the other 122 in a generally longitudinal direction of one of the floor components, and (iv) on either side of the airflow opening 100, so as to generally form a duct underneath the floor components 83 and 84, which is arranged to be closed at either proximal pair of sides 121, 121 and 122, 122 of the first and second tuyere components 115, 116, for guiding the airflow to the airflow opening 100. The tuyere components 115, 116 are generally rectangular in shape being elongated in the side-to-side direction relative to the top-to-bottom direction and thus in the tuyere forming condition these components 115, 116 are generally parallel to one another in their side-to-side direction relative to the longitudinally extending vertex 96 and are oriented more upright than horizontal. The tops 118 of the tuyere components 115, 116 are arranged sufficiently close to the lower faces 87 of the floor components 83, 84 so that the airflow received by the duct from the airflow source 25 is substantially discharged therefrom at the airflow openings 100 and 102, 103 instead of between the lower faces 87 of the floor components and the tops 118 of the tuyere components. As the airflow opening 100 defined by the floor components arranged in the floor forming condition is located at the vertex 96 centrally of the forge pot 14, one tuyere component is disposed underneath each floor component.

The forge pot kit yet further includes a gate component 127 made from rigid non-combustible planar sheet material having opposite ends 129, 130 and opposite sides 132, 133 extending therebetween. As more clearly shown in FIG. 9, the gate component 127 is arrangeable, relative to the floor components 83, 84 arranged in the floor forming condition and the tuyere components 115, 116 arranged in the tuyere forming condition, (i) at a fixed location spaced below the floor components 83, 84, so as to be spaced below the airflow opening 100, and (ii) in a manner so as to extend from one side 132 to the other side 133 generally between the tuyere components 115, 116 at a spaced location from their tops 118, so as to close the duct at a location opposite the airflow opening 100 so as to form with at least the first and second tuyere components 115, 116 the air chamber 22 of the forge pot.

Figure 10:
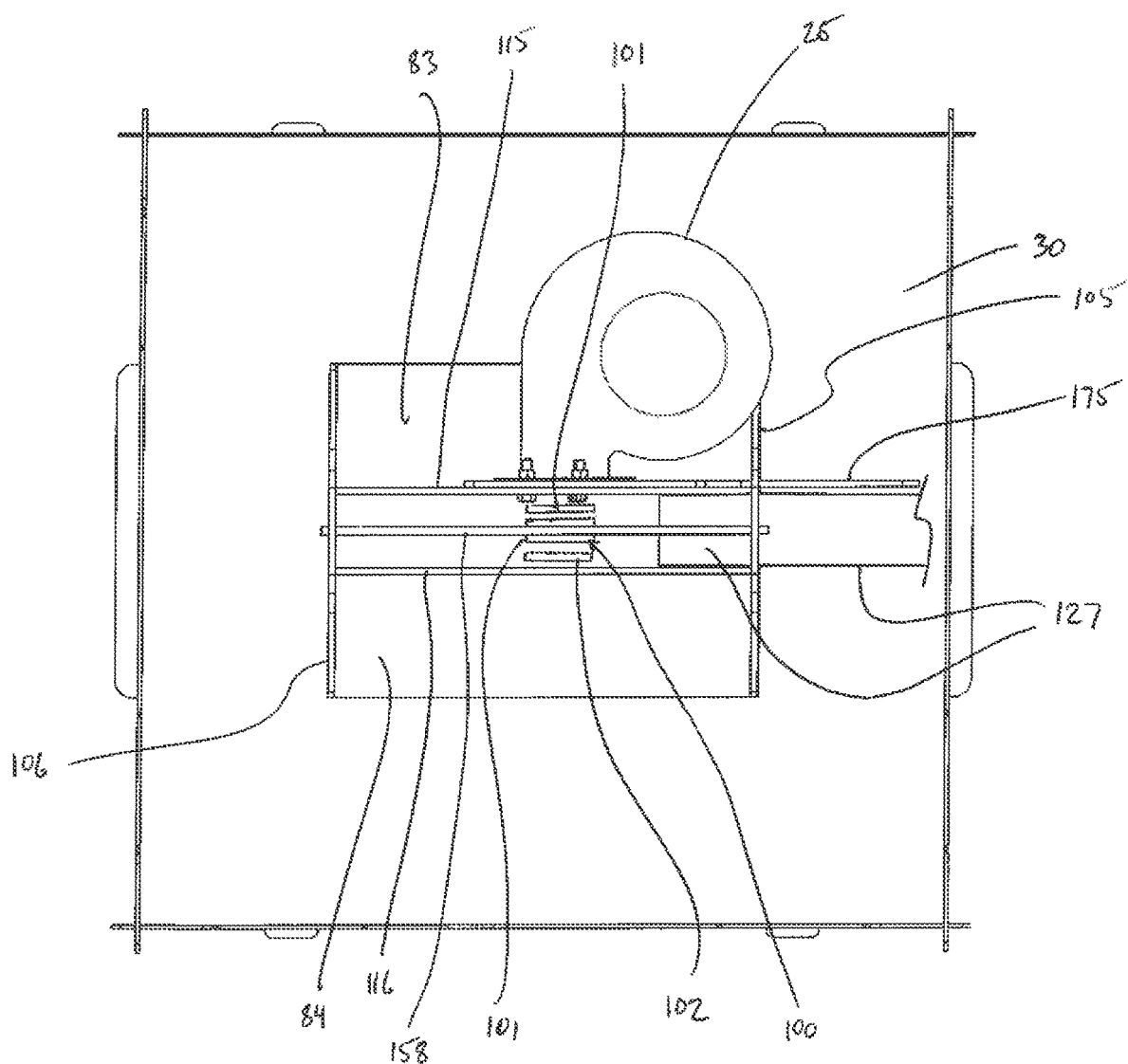
FIG. 10 is a bottom plan view of the arrangement of FIG. 1 with a gate component partially shown in a dumping position.

In addition to acting to close the air duct, understanding that it is closed at the opposite pairs of sides 121, 121 and 122, 122 in some manner so as to form a generally enclosed chamber that can suitably convey the airflow from the source 25 and up to the airflow opening 100, the gate component 127 also is generally provided for enabling release of ash generated by the combustion of the fuel in the container 20 and passing by gravity into the air chamber 22 through the airflow opening. Thus the gate component is operable for movement between a closed position as shown more clearly in, for example, FIG. 9 in which the air chamber is closed opposite the airflow opening 100 and a dumping position, as shown in FIG. 10, in which the air chamber is open opposite the airflow opening 100 for releasing ash and in which the airflow from the source 25 cannot be suitably conveyed to the airflow opening. This will be described in more detail shortly.

Thus is formed the forge pot 14 in an assembled condition of the kit which includes the floor forming condition of the first and second floor components 83 and 84, the wall components 105, 106 being connected to the adjacent pairs of the ends 89, 89 and 90, 90 of the floor components in the floor forming condition, the tuyere forming condition of the first and second tuyere components 115, 116 providing the duct and the gate component 127 being supported at the fixed location to close the duct opposite the airflow opening 100 and airflow openings 102, 103.

The kit also includes the chamber opening 27 defined in the first tuyere component 115 for fluidically communicating the airflow source 25 with the air chamber 22 so that the airflow therefrom can pass through the air chamber and through the airflow opening 100 to the container 20 of the forge pot. In the illustrated arrangement the chamber opening 27 is formed at a spaced location from a periphery of the first tuyere component 115 collectively defined by its top 118, bottom 119 and opposite sides 121 and 122. Furthermore, in the illustrated arrangement the chamber opening 27 is located in longitudinal alignment, relative to the vertex 96 of the bottom of the container 20, with the airflow opening 100 and 102, 103.

Turning back now to the wall components 105, 106 in more detail, the first and second wall components 105, 106 are sized and shaped in a manner such that, when the wall components are arranged in their wall forming condition and are connected to the adjacent pairs of the ends 89, 89 or 90, 90 of the floor components which are arranged in the floor forming condition, the wall components extend from their tops 108 above the bottom vertex 96 to their bottoms 109 which are located both below the bottom vertex 96 and at the sides 121 or 122 of the tuyere components 115, 116. Further, the wall components 105, 106 are arranged to be connectable to the tuyere components 115, 116 in the tuyere forming condition so as to support the tuyere components in this condition, and so as to act to close the duct at either proximal pair of sides 121, 121 or 122, 122 of the tuyere components and thus form the air chamber 22 together with the tuyere components 115, 116 and the gate component 127. That is, the wall components 105, 106 which already form the end walls of the container 20 of the forge pot also cooperate with other components of the kit to form the air chamber 22.

As more clearly shown in FIGS. 8 and 9, in the illustrated arrangement the wall components 105, 106 are generally T-shaped such that the tuyere components 115, 116 in the tuyere forming condition connected to the wall components are disposed generally centrally relative to the bottom vertex 96 of the floor components 83, 84 in the floor forming condition. As such, each T-shaped wall component 105, 106 comprises a central leg portion 140 defining the bottom 109 of the wall component and a transversely extending upper arm portion 141 disposed at one end of the leg portion 140 and defining the wall component top 108. The wall component is connected to the floor components 83, 84 at its transversely extending upper arm portion 141 and to the tuyere components 115, 116 at its central leg portion 140.

Specifically, for interconnecting with the wall components 105, 106 the first and second tuyere components 115, 116 include projecting tabs 144 at their sides 121, 122 which are matably receivable in closed slots 146 defined in the wall components to support the first and second tuyere components in the tuyere forming condition. Thus each tuyere component connects to both wall components 105, 106 one of which is located at each side 121, 122 of the tuyere component. Each wall component 105, 106 includes a plurality of the tuyere receiving slots 146 at least one of which receives the tab 144 of the first tuyere component 115 and at least another which receives the tab 144 of the second tuyere component 116, since each wall component connects to both tuyere components. The tabs 144 lie in a common plane with a remainder of the tuyere component, and the tuyere-receiving slots 146 which are wholly spaced from a periphery of the wall component collectively defined by the top 108, bottom 109 and opposite sides 111, 112 extend from one end thereof to the other generally in a direction from the bottom 109 to the top 108 of the wall component as the tuyere components are to be oriented substantially upright in the tuyere forming condition when the forge pot 14 is carried by the forge table 12. The wall components and tuyere components are interconnected only by the cooperation of the tabs 144 and slots 146. Furthermore, the tuyere components are not interconnected across the duct.

For interconnecting with the wall components 105, 106 the first and second floor components 83, 84 include projecting tabs 149 at their ends 89, 90 which are matably receivable in closed slots 150 defined in the wall components 105, 106 to support the floor components in the floor forming condition. Thus each floor component connects to both wall components 105, 106 one of which is located at each end 89, 90 of the floor component. Each wall component 105, 106 includes a plurality of the floor receiving slots 150 at least one of which receives the tab 149 of the first floor component 83 and at least another which receives the tab 149 of the second floor component 84, since each wall component connects to both floor components. The tabs 149 lie in a common plane with a remainder of the floor component, and the floor-receiving slots 150 which are wholly spaced from the periphery of the wall component extend from one end thereof to the other in an inclined direction extending both generally from one side 111 to the other side 112 of the wall component and from the top 108 to the bottom 109 as the floor components are to be disposed in opposite inclined orientations in the floor forming condition when the forge pot 14 is carried by the forge table 12. The wall components and floor components are interconnected only by the cooperation of the tabs 149 and slots 150. Furthermore, it will be appreciated that the floor receiving slots 150 define first mating members of the wall component arranged to connect to the floor components and the tuyere-receiving slots 146 define second mating members of the wall component arranged to connect to the tuyere components In the illustrated arrangement, the first and second floor components 83, 84 when arranged in the floor forming condition are supported in this condition only by the above-described connection to the wall components, and the first and second floor components are detached from one another at the bottom vertex 96. That is, the floor components are not interconnected at all including at their proximal sides 93 located at the vertex 96. Furthermore, the tops 118 of the first and second tuyere components 115, 116 which are arranged in the tuyere forming condition are detached from the lower faces 87 of the first and second floor components 83, 84 arranged in the floor forming condition so as not to be connected thereto. As the tuyere components are not interconnected across the duct nor connected to the floor components they are supported in the tuyere forming condition only by connection to the wall components.

In such an arrangement therefore the wall components 105, 106 are interconnectable by a distinct bridging member 152 arranged to extend through the air chamber generally longitudinally of the bottom vertex 96 but in detached condition to the first and second floor components 83, 84 arranged in the floor forming condition and in spaced relation to the first and second tuyere components 115, 116 arranged in the tuyere forming condition so as to hold the wall components in fixed relation to one another. This rigidifies the structure, that is, the assembly of the floor components and the tuyere components each separately connected to the wall components which are themselves disposed in spaced relation to one another.

In the illustrated arrangement, the bridging member 152 is a longitudinally elongated rod spanning from one wall component to the other parallel to the vertex 96, which is connected to each wall component at a location below the floor receiving slots 150, that is the first mating members of the wall component, but above the tuyere receiving slots 146, that is the second mating members of the wall component. The connection location of the bridging member 152 at the wall component is also generally central relative to the opposite sides 111, 112 of the wall component. This enables substantially a single member directly interconnecting the wall components to hold the wall components in fixed relation to each other. Also, as the rod is relatively narrow in diameter its location within the duct or air chamber does not substantially affect, for example impede, upward airflow to the airflow opening or ash falling by gravity through the air chamber.

Nevertheless, as the bridging member 152 is located at a central location and relatively closely to the vertex 96 where is formed the airflow opening 100, there are provided a plurality of airflow openings including a first additional airflow opening 102 defined in the first floor component 83 at a location thereon which is offset from a vertical plane in which the bridging member 152 lies, and which in the illustrated arrangement also includes the vertex 96, and a second additional airflow opening 103 defined in the second floor component 84 at a location thereon which is offset from the vertical plane. In this manner, ash generated by the combustion of the fuel supported in the container of the forge pot and passing by gravity through the air chamber is less likely to collect on the bridging member 152. Even without the presence of the central airflow opening 100, where there is provided the bridging member it is generally preferable to have a plurality of airflow openings, at least one on either side of the bridging member 152, such that any possible impacts of the location of the bridging member on airflow and ash deposition in the air chamber is reduced.

When ash from combusted fuel does enter the air chamber 22 through any of the airflow openings 100, 102 or 103, the duct of the air chamber 22 is arranged such that the gate component 127 is supported for sliding movement in a direction within a plane in which the gate component 127 resides opposite the airflow opening 100, that is, the plane in which the gate component is supported when located opposite the airflow opening 100, between the closed position in which the air chamber is closed opposite the airflow opening and the dumping position in which the air chamber is open opposite the airflow opening for releasing the ash. More specifically, as the first wall component 105 extends below the bottom vertex 96 of the floor components 83, 84 disposed in the floor forming condition and furthermore below the plane of the gate component 127 in the closed position, the first wall component 105 includes a gate slot 156 arranged to slidably receive the gate component 127 displaced in the direction of the sliding movement. The gate slot 156 is located below the tuyere receiving slots 146 and extends from one end of the slot to the other generally in a direction from one side 111 of the wall component to the other 112, as the gate component is generally horizontally oriented between the generally upright tuyere components 115, 116 in the tuyere forming condition. The gate slot 156 is closed so as to be wholly spaced from the wall component periphery. Additionally to the gate slot 156 there is provided a support beam 158 connected to the first wall component 105 subjacent the gate slot 156 and extending transversely to the first wall component beneath the gate component 127 so that the support beam 158 and gate slot 156 cooperate to support the gate component 127 in its sliding movement. The support beam 158 projects from an inner face 161 of the first wall component 105 which is arranged to face the opposite wall component and generally so as to delimit an interior of the air chamber 22. The gate slot 156 is sized and shaped so as to matably receive a transverse periphery of the gate component so as to confine transverse movement of the gate component relative to its sliding direction. Thus is provided a simple arrangement for supporting a movable gate for releasing ash from the air chamber.

The gate component 127 at its first end 129 defines a handle 163 for gripping by a hand of a user so as to be operable by manually displacing the gate component 127 between the closed and dumping positions. The gate component 127 is arranged so that in the closed position the handle 163 projects out of the air chamber 22 through the gate slot 156.

As the second wall component 106 extends below the bottom vertex 96 of the floor components in the floor forming condition and furthermore below the plane of the gate component 127 in the closed position, just like the first wall component, the support beam 158 extends from the first wall component 105 to the second wall component 106 so as to interconnect the wall components. This further rigidifies the forge pot in the assembled condition.

In further regard to the wall components, each wall component 105, 106 forms hangers at its opposite sides 111 and 112, each in the form of a hook having an upper arm 166 extending generally horizontally outwardly towards a free end 167 of the upper arm and a lower arm 169 depending from the upper arm at an inwardly spaced location from the free end 167 thereof, for supporting the forge pot in substantially fixed location when received in the central opening 32 of the tabletop of the forge table. A side-to-side width measured between opposite lower arms 169 of each wall component 105, 106 is sized slightly smaller than a width of the central opening 32, which is rectangular in shape, so as to resist relative movement in directions parallel to the width of the respective wall component, and a bottom of the upper arm 166 is arranged to engage the upper surface 34 of the tabletop such that the forge pot 14 is supported by hanging through the opening 32 of the tabletop of the forge table 12.

It will be appreciated that in the illustrated arrangement the first and second wall components 105, 106 are substantially identical except that the second wall component lacks the gate slot 156.

To arrange the external airflow source 25 in fluidic communication with the air chamber 22, the forge pot kit includes a plurality of mounting pegs 172 each arrangeable relative to the chamber opening 27 to project in a longitudinal direction outwardly from the first tuyere component 115 for mounting the air source 25 in fluidic communication with the chamber opening 27. That is, the mounting pegs 172 are distinct and separable from the first tuyere component 115 but each is arranged to be affixed relative to the chamber opening at an external location of the air chamber 22 in a manner projecting outwardly from the air chamber.

Additionally, the forge pot kit includes a valve component 175 having a first side 177, an opposite second side 178, and defining a valve opening 180 for locating intermediate the chamber opening and the air source, which opens at the first and second sides 177, 178 of the valve component so as to permit passage of air from the first side 177 to the second side 178 through the valve opening 180. Being a part of the kit the valve component 175 also is made from rigid non-combustible planar sheet material. In addition to the valve opening 180, the valve component 175 defines at least one slot 183 formed through a thickness of the sheet material measured from the first side 177 to the second side 178 for receiving the mounting pegs 172. The valve component thus is supported on the mounting pegs 172 with its second side 178 at or adjacent the air chamber 22 and the first side 177 distal thereto such that the valve component 175 is connected to the air chamber 22 and is arranged at a location intermediate the air chamber and the airflow source 25 for controlling passage of the airflow from the airflow source to the air chamber.

Figure 11:
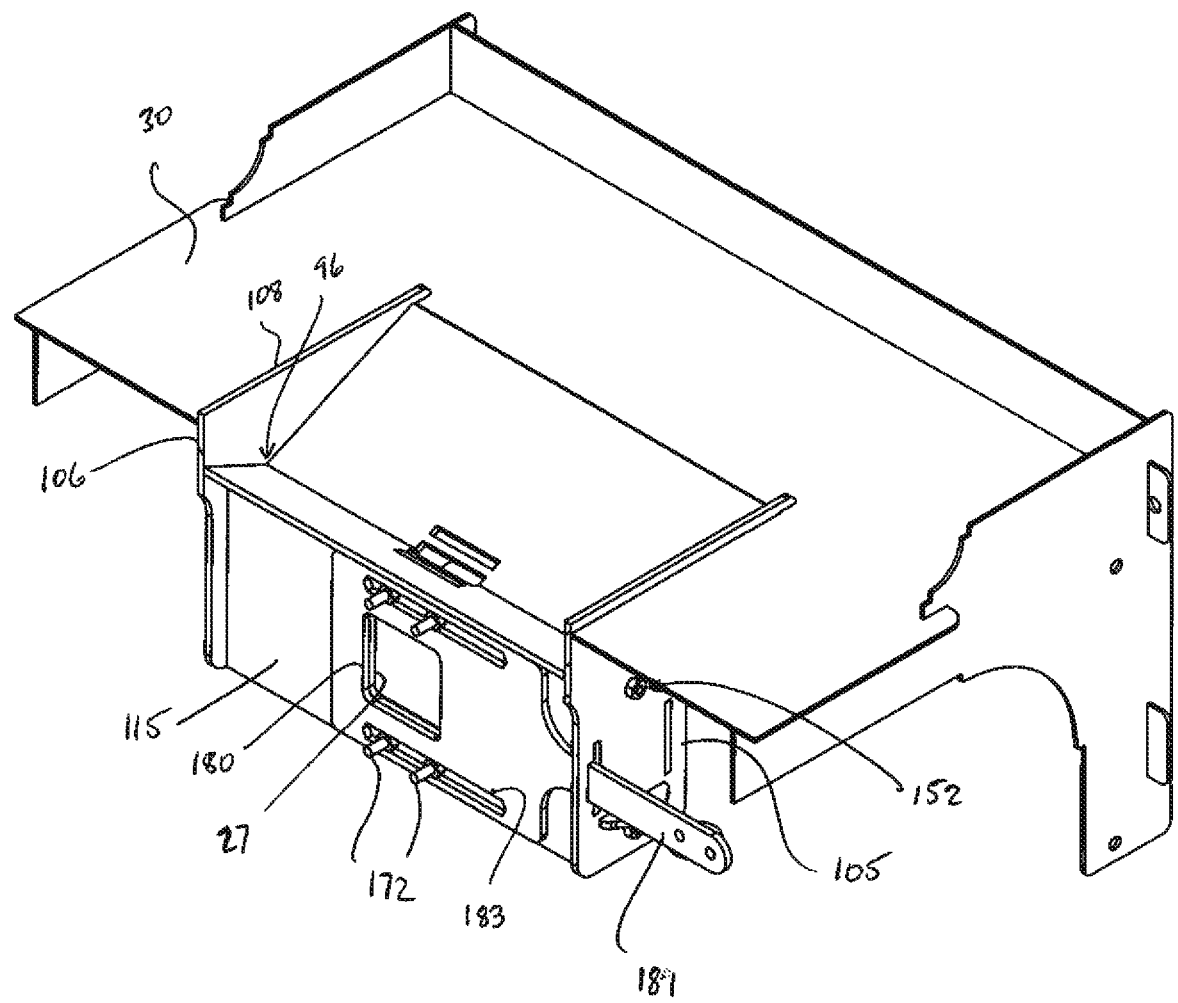
FIG. 11 is a perspective view showing the arrangement of FIG. 1 in cross-section along line 11-11 in FIG. 6.
Figure 12:
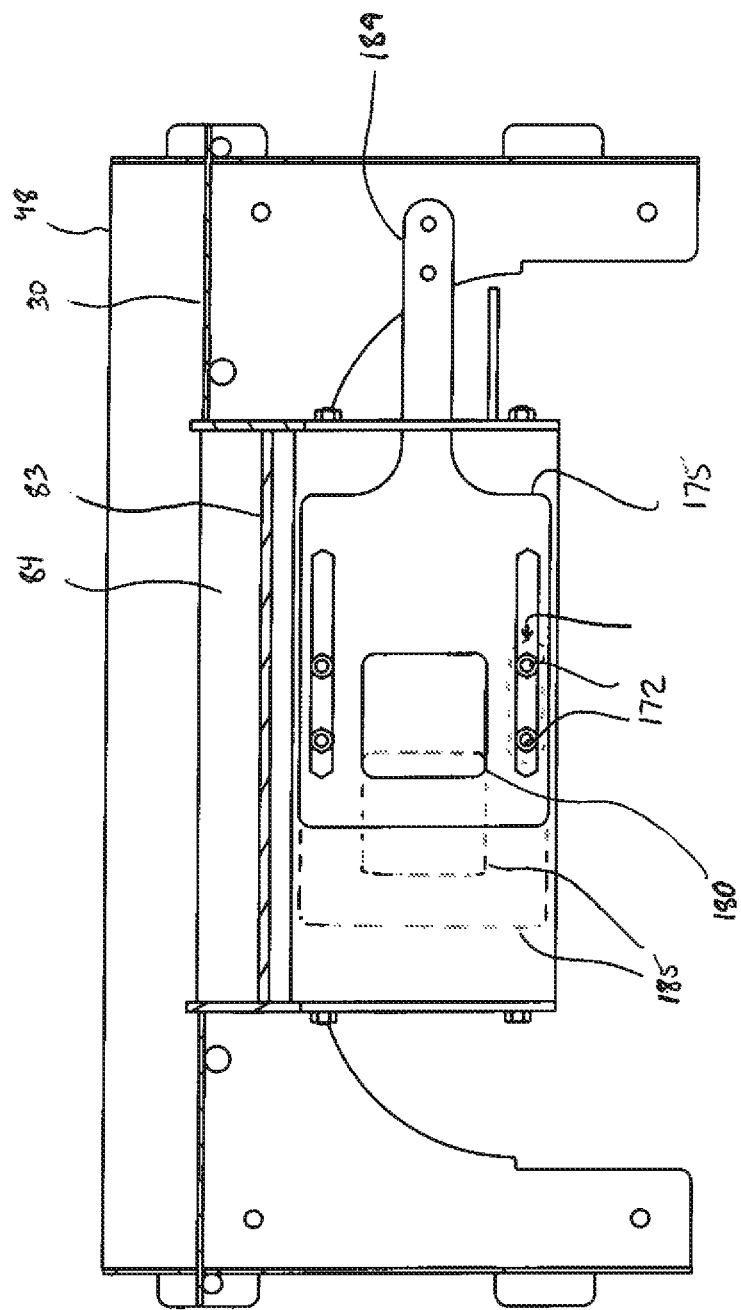
FIG. 12 is an elevational view of the arrangement as shown in FIG. 11.

The valve component 175 is arranged to be movably supported by the mounting pegs 172 for movement transversely to the pegs between an open position, as shown more clearly in FIGS. 11 and 12, in which the valve opening 180 is aligned with the chamber opening 27 so as to permit passage of the airflow from the air source 25 to the air chamber 22 and an obstructing position, as shown in phantom at 185 in FIG. 12, in which the valve opening 180 is misaligned with the chamber opening 27 so as to obstruct the airflow from passage to the air chamber through the chamber opening 27 and thus restrict same, such that the valve component 175 is operable to selectively obstruct communication of the airflow source 25 and the air chamber 22. Therefore in the illustrated arrangement where the valve component 175 includes the slots 183 receiving the pegs 172 then the slots act to form a track defining a path of movement between the open and obstructing positions while the valve component 175 remains supported at the air chamber by the mounting pegs 172. Furthermore, it will be appreciated that in the open position of the valve component the passage of the airflow to the air chamber 22 is substantially unobstructed while in the obstructing position airflow is restricted to an overlapped opening sized smaller in surface area than the chamber opening 27 and formed by that portion of the chamber opening which is overlapped by the valve opening 180.

In the illustrated arrangement, the mounting pegs 172 are arranged in one or more parallel linear rows 187 and the valve component 175 is arranged to be movable between the open and obstructing positions in sliding movement in a direction parallel to the rows. Therefore the slots 183 each extend linearly from one end of the slot to the other.

The valve component 175 defines at one end thereof a handle 189 for gripping by a user so as to manually displace the valve component between the open and obstructing positions. The valve handle 189 is presented at a common side of the assembled forge pot 14 as is the first wall component 105 through which the handle 163 of the gate component 127 passes. As the first wall component 105 extends outwardly beyond the first tuyere component 115 to a location where it obstructs the handle 189 of the valve component, a slot 192 which registers with the handle 189 is defined in the first wall component 105 such that the handle can pass therethrough to a suitable location for gripping by the user.

It will be appreciated that normally the air source 25 is mounted in fixed relation to the air chamber 22 in such a manner that a discharge opening of the source is in fluidic communication with the chamber opening 27 but for the valve component 175 which is disposed in series between the air source 25 and air chamber 22 relative to the flow of air from the former to the latter such that the valve component can be operated to control passage of the airflow to the air chamber 22. This is particularly suitable when the airflow source 25 is an electric blower as in the illustrated arrangement which is preferably continually operated as frequent switching between on and off modes acts to reduce service life of the blower.

To assemble the forge pot 14, typically one of the wall components such as the second wall component 106 is provided as a mounting location for arranging both floor components 83, 84 and both tuyere components 115, 116 in their respective forge pot-forming conditions. The bridging member 152 and the support beam 158 each may be connected at one end to the wall component. The valve component 175 is connected to the first tuyere component 115 by the mounting pegs 172. Then, the other wall component, in this instance the first wall component 105, is connected to the free ends of the components (excluding the valve component) already mounted to the other wall component 106 so as to sandwich them between the pair of wall components. In doing so the handle 189 of the valve component is passed through the corresponding slot 192. The gate component 127 may be slidably inserted through slot 157 after the forge pot is substantially assembled. The air source 25 is coupled only after the assembled forge pot 14 is passed from position at the upper surface 34 of the tabletop component and through the central opening 32 therein such that the hangers formed by arms 166 and 169 rest in engagement with the tabletop component 30, the upper arms 166 resting in engagement with the upper surface 34 and the lower arms in engagement with edges of the inner periphery 44 of the tabletop component.

Thus is provided an arrangement for a kit of components, in respect of a forge pot, which in an unassembled state are easily portable as they can be packed flat and shipped in this condition to an end user who can assemble the kit.

Furthermore there is provided a simple arrangement for controlling an amount of the airflow from the source that is admitted to the air chamber so as to control combustion of the fuel while the airflow source is continually operated to generate a constant airflow.

It will be appreciated that the components are made from a material which is non-combustible so that they can suitably withstand heat generated by the combustion of the fuel in the forge pot without deforming. This material is also sufficiently rigid such that components substantially maintain their predefined (prior to assembly) planar shape. When the material is metallic, such as steel, each of the components basically forms a plate.

The scope of the claims should not be limited by the preferred embodiments set forth in the examples but should be given the broadest interpretation consistent with the specification as a whole.

The invention claimed is:

1. A kit for forming a forge table having a plurality of legs and a tabletop supported by the legs for carrying a forge pot in which a fuel for combustion can be supported so as to generate heat for heating a metallic workpiece, the kit comprising:
   - a tabletop component made from rigid non-combustible planar sheet material for forming the tabletop of the forge table, the tabletop component defining a central opening for receiving the forge pot in the tabletop component;
   - a plurality of leg components made from rigid non-combustible planar sheet material for forming the legs of the forge table;
   - each leg component having a top, a bottom opposite to the top adapted for engaging a support surface, and opposite sides extending between the top and the bottom;
   - each one of a plurality of pairs of the leg components being interconnectable in a paired condition to form the legs of the forge table, in the paired condition a first one of the pair of the leg components and a second one thereof being arranged (i) generally side by side, so that the tops of the first and second leg components are beside each other and the bottoms thereof are beside each other, and (ii) in transverse orientation relative to one another so that the formed leg of the forge table is generally V-shaped from one of the sides of the first leg component, which is distal to the second leg component, to one of the sides of the second leg component, which is distal to the first leg component; and
   - for each pair of the leg components interconnectable in the paired condition, at least one of the first and second leg components being connectable at a spaced location from the bottom thereof to the tabletop component in a manner such that a plane defined by the tabletop component is oriented transversely to both a plane defined by the first leg component and a plane defined by the planar second leg component, so that, in an assembled condition of the kit in which the tabletop component and the pairs of the leg components arranged in the paired condition are interconnected, the leg components are arranged to stand upwardly from the support surface and to carry the tabletop component in generally horizontal orientation at a spaced height above the support surface.

2. The kit of claim 1 wherein the tabletop component has an inner periphery delimiting the central opening and a rectilinear outer periphery comprising a plurality of substantially straight peripheral edges, and each leg component is sized in width from one side to the other substantially equal to a length of a corresponding one of the peripheral edges, so that when interconnected to the tabletop component the leg components collectively span from one side of each leg component to the other side thereof the outer periphery of the tabletop component.

3. The kit of claim 2 wherein each leg component extends generally in an arch shape from the bottom thereof at one of the sides of the leg component to the bottom thereof at the other one of the sides so as to include at least two bottom edges at the bottom of the leg component, one of the bottom edges generally at each side of the leg component, for engaging the support surface.

4. The kit of claim 2 wherein the leg components each have an inner face arranged for facing generally towards the central opening and the forge pot and an opposite outer face, and, in the assembled condition, the outer periphery of the tabletop component is in abutment with the inner faces of the leg components interconnected thereto such that the tabletop component is confined in fixed location by the leg components interconnected to each other and to the tabletop component.

5. The kit of claim 2 wherein, in the assembled condition, the leg components extend above the tabletop component to the tops of the leg components which are spaced above an upper surface of the tabletop component arranged to face upwardly, so as to collectively form an annular upstanding flange substantially encompassing the tabletop component.

6. The kit of claim 1 wherein, for each pair of the leg components interconnectable in the paired condition, the first leg component includes at its periphery projecting tabs which are adapted to be received in closed slots defined in the second leg component for interconnecting in the paired condition.

7. The kit of claim 1 wherein the tabletop component includes male-type connection elements which are matably receivable in female-type connection elements defined by respective ones of the pairs of the leg components, which are interconnectable with the tabletop component, for interconnecting in the assembled condition, and each one of a first pair of the leg components which are located diametrically opposite to one another in the assembled condition include male-type connection elements which are matably receivable in female-type connection elements defined by each one of a second pair of the leg components which in the assembled condition are located in diametrically opposite relation to one another and crosswise to the opposite relation of the first pair of the leg components.

8. The kit of claim 7 wherein the tabletop component includes a plurality of the male-type connection elements, which is arranged for connecting with a plurality of the female-type connection elements defined by each one of the first diametrically opposite pair of the leg components, and a single one of the male-type connection element arranged for connecting with a corresponding one of the female-type connection element of each one of the second diametrically opposite pair of the leg components.

9. The kit of claim 8 wherein the male-type connection elements of the tabletop component and the leg components are projecting tabs located at peripheries thereof and the female-type connection elements of the leg components are slots.

10. The kit of claim 8 wherein the single male-type connection element of the tabletop component is a projecting tab at the periphery thereof and the corresponding one of the female-type connection element of each one of the second diametrically opposite pair of the leg components is a slot extending from one end of the slot to the other in a direction from one side of the leg component towards the other side, and the top of the leg component defines a downwardly extending cut-out which is in communication with a central portion of the slot so as to leave the ends of the slot as closed in order to resist against upward lifting of the single tab out of the slot and so as to form, in the assembled condition, an extension of an upwardly-facing upper surface of the tabletop component on the single tab which is cantilevered beyond the leg component.

11. A kit for forming a forge pot having a container for supporting fuel to be combusted and an air chamber which is fluidically communicated with the container for guiding to the container an airflow from an airflow source for combusting the fuel in the container so as to generate heat for heating a metallic workpiece, the kit comprising:

first and second floor components made from rigid non-combustible planar sheet material each having upper and lower faces, longitudinally opposite ends and laterally opposite sides extending therebetween, the floor components being arrangeable in a floor forming condition to form a bottom of the container of the forge pot on which the fuel can be supported;

in the floor forming condition the first and second floor components being arranged (i) in fixed intimate relation to one another, (ii) generally side by side, so that a first one of the ends of the first floor component is beside a first one of the ends of the second floor component and a second one of the ends of the first floor component is beside a second one of the ends of the second floor component, and (iii) in transverse relation to one another, with the upper faces of the floor components facing generally upwardly, such that the bottom of the container is generally V-shaped from one of the sides of the first floor component, which is distal to the second floor component, to one of the sides of the second floor component, which is distal to the first floor component, the bottom of the container including a longitudinally extending bottom vertex and defining an angle less than 180 degrees between the upper surfaces of the floor components;

in the floor forming condition the first and second floor components defining an airflow opening for permitting air to pass from below the bottom of the container and above thereof;

first and second wall components made from rigid non-combustible planar sheet material each having a top and a bottom, the first and second wall components each being connectable at an adjacent pair of the ends of the first and second floor components arranged in the floor forming condition in a manner such that a plane defined by the wall component is oriented transversely to both a plane defined by the first floor component and a plane defined by the second floor component, and so that the top of the wall component is located spaced above the bottom vertex formed by the first and second floor components in the floor forming condition, so as to form end walls of the container of the forge pot enclosing the bottom of the container at either adjacent pair of the ends of the first and second floor components arranged in the floor forming condition;

first and second tuyere components made from rigid non-combustible planar sheet material each having a top, a bottom and opposite sides extending therebetween, the first and second tuyere components being arrangable in a tuyere forming condition in which, relative to the first and second floor components arranged in the floor forming condition, the first and second tuyere components are arranged (i) in fixed location under the floor components with the top of each of the first and second tuyere components in intimate relation with the lower face of one of the first and second floor components, (ii) in a manner such that a plane defined by each of the first and second tuyere components is oriented transversely to the plane defined by the floor component with which the top of the tuyere component is disposed in intimate relation, (iii) in a manner such that each of the first and second tuyere components extends from one of its sides to the other in a generally longitudinal direction of one of the floor components, and (iv) on either side of the airflow opening, so as to generally form a duct underneath the floor components, which is arranged to be closed at either proximal pair of sides of the first and second tuyere components, for guiding the airflow to the airflow opening;

a gate component made from rigid non-combustible planar sheet material having opposite ends and opposite sides extending therebetween, the gate component being arrangeable, relative to the floor components arranged in the floor forming condition and the tuyere components arranged in the tuyere forming condition, (i) at a fixed location spaced below the floor components, so as to be spaced below the airflow opening, and (ii) in a manner so as to extend from one of its sides to the other generally between the tuyere components at a spaced location from their tops, so as to close the duct at a location opposite the airflow opening so as to form with at least the first and second tuyere components the air chamber of the forge pot; and a chamber opening defined in the first tuyere component for fluidically communicating the airflow source with the air chamber so that the airflow therefrom can pass through the air chamber and through the airflow opening to the container of the forge pot.

12. The kit of claim 11 wherein the first and second wall components are sized and shaped in a manner such that, when the wall components are connected to the adjacent pairs of the ends of the floor components arranged in the floor forming condition, the wall components extend from their tops above the bottom vertex to their bottoms which are located below the bottom vertex and at the sides of the tuyere components, and further the first and second wall components are arranged to be connectable to the tuyere components in the tuyere forming condition so as to support the tuyere components therein, and so as to act to close the duct at either proximal pair of sides of the tuyere components and thus form the air chamber with the tuyere components and the gate component.

13. The kit of claim 12 wherein the wall components are generally T-shaped such that the tuyere components in the tuyere forming condition connected thereto are disposed generally centrally relative to the bottom vertex of the floor components in the floor forming condition.

14. The kit of claim 12 wherein the first and second tuyere components include projecting tabs at their sides which are matably receivable in closed slots defined in the wall components to support the first and second tuyere components in the tuyere forming condition.

15. The kit of claim 11 wherein the first and second floor components arranged in the floor forming condition are supported therein only by the wall components each connected to the adjacent pair of the ends of the floor components, and the first and second floor components are detached from one another at the bottom vertex.

16. The kit of claim 15 wherein the first and second floor components include projecting tabs at their ends which are matably receivable in closed slots defined in the wall components to support the floor components in the floor forming condition.

17. The kit of claim 11 wherein the tops of the first and second tuyere components arranged in the tuyere forming condition are detached from the lower faces of the first and second floor components arranged in the floor forming condition so as not to be connected thereto.

18. The kit of claim 12 wherein the first and second wall components are interconnectable by a distinct bridging member arranged to extend through the air chamber generally longitudinally of the bottom vertex but in detached condition to the first and second floor components arranged in the floor forming condition and in spaced relation to the first and second tuyere components arranged in the tuyere forming condition so as to hold the wall components, connected at the adjacent ends of the floor components, in fixed relation to one another.

19. The kit of claim 18 wherein the wall components each include a pair of first mating members for connecting to the floor components and a pair of second mating members for connecting to the tuyere components, and the bridging member is connected to each wall component at a location below the first mating members but above the second mating members.

20. The kit of claim 18 wherein there is provided a plurality of the airflow opening in the floor components arranged in the floor forming condition including a first airflow opening defined in the first floor component at a location thereon which is offset from a vertical plane in which the bridging member lies and a second airflow opening defined in the second floor component at a location thereon which is offset from the vertical plane.

* * * * *